US009185718B2

(12) United States Patent
Kadous et al.

(10) Patent No.: US 9,185,718 B2
(45) Date of Patent: Nov. 10, 2015

(54) CENTRALIZED COEXISTENCE MANAGER FOR CONTROLLING OPERATION OF MULTIPLE RADIOS

(75) Inventors: Tamer A. Kadous, San Diego, CA (US); Ashok Mantravadi, San Diego, CA (US); Venugopal V. Veeravalli, Urbana, IL (US); Charles A. Bergan, Cardiff, CA (US); Joel B. Linsky, San Diego, CA (US); Richard D. Wietfeldt, San Diego, CA (US); George Chrisikos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 880 days.

(21) Appl. No.: 12/626,382

(22) Filed: Nov. 25, 2009

(65) Prior Publication Data

US 2010/0330977 A1  Dec. 30, 2010

Related U.S. Application Data

(60) Provisional application No. 61/221,244, filed on Jun. 29, 2009.

(51) Int. Cl.
*H04W 72/12* (2009.01)
*H04W 88/06* (2009.01)

(52) U.S. Cl.
CPC .......... *H04W 72/1215* (2013.01); *H04W 88/06* (2013.01)

(58) Field of Classification Search
CPC . H04W 72/1215; H04W 88/06; H04W 24/10; H04W 36/20; H04W 84/12; H04W 72/082
USPC ................ 455/418–419, 414.1, 435.1–435.2, 455/41.2, 552.1; 370/338, 328
See application file for complete search history.

(56) References Cited

U.S. PATENT DOCUMENTS

| 4,933,845 A | 6/1990 | Hayes |
| 5,486,210 A | 1/1996 | Kerr et al. |

(Continued)

FOREIGN PATENT DOCUMENTS

| CN | 1449601 A | 10/2003 |
| CN | 1475064 A | 2/2004 |

(Continued)

OTHER PUBLICATIONS

International Search Report and Written Opinion—PCT/US2010/040442, International Search Authority—European Patent Office—Oct. 21, 2010.

(Continued)

*Primary Examiner* — Brandon Miller
(74) *Attorney, Agent, or Firm* — Rupit M. Patel

(57) ABSTRACT

Systems and methodologies are described herein that facilitate a centralized structure for managing multi-radio coexistence for a mobile device and/or other suitable device(s). As described herein, a control plane coexistence manager (CxM) entity and/or a data plane CxM entity can be implemented to directly interact with a set of associated transceivers (e.g., radios, etc.) in order to manage conflicts between events corresponding to the transceivers. Further, CxM operation can be divided between the control and data planes such that the control plane handles configuration and long-term operations such as radio registration, sleep mode management, long-term event resolution, interaction with upper layers, etc., while the data plane handles short-term operations with respect to radio event management based on incoming notifications or event requests. For instance, the data plane can evaluate a set of requested events, select event(s) to be executed, and provide responses to the associated transceivers relating to the selection(s).

36 Claims, 15 Drawing Sheets

(56) References Cited

U.S. PATENT DOCUMENTS

| | | | |
|---|---|---|---|
| 5,726,893 A | 3/1998 | Schuchman et al. | |
| 6,128,483 A | 10/2000 | Doiron et al. | |
| 6,571,285 B1 | 5/2003 | Groath et al. | |
| 6,944,430 B2 | 9/2005 | Berstis | |
| 7,035,314 B1 | 4/2006 | Linsky | |
| 7,317,900 B1 | 1/2008 | Linde et al. | |
| 7,324,815 B2 | 1/2008 | Ross et al. | |
| 7,339,446 B2 | 3/2008 | Su et al. | |
| 7,412,250 B2 | 8/2008 | Fukuda | |
| 7,433,970 B1 | 10/2008 | Euler et al. | |
| 7,440,728 B2 * | 10/2008 | Abhishek et al. | 455/41.2 |
| 7,454,171 B2 | 11/2008 | Palin et al. | |
| 7,610,057 B2 * | 10/2009 | Bahl et al. | 455/522 |
| 7,623,879 B2 | 11/2009 | Honkanen et al. | |
| 7,685,325 B2 | 3/2010 | Batchelor et al. | |
| 7,786,755 B2 | 8/2010 | Yao et al. | |
| 7,903,642 B2 | 3/2011 | Voutilainen et al. | |
| 7,929,432 B2 | 4/2011 | Zhu et al. | |
| 7,990,882 B1 | 8/2011 | Bedair et al. | |
| 7,990,992 B2 | 8/2011 | Muukki et al. | |
| 8,059,553 B2 | 11/2011 | Leung et al. | |
| 8,060,085 B2 | 11/2011 | Goulder et al. | |
| 8,095,176 B2 | 1/2012 | Sudak | |
| 8,184,154 B2 | 5/2012 | Estevez et al. | |
| 8,340,706 B2 | 12/2012 | Zetterman et al. | |
| 8,660,548 B1 | 2/2014 | Lambert | |
| 2002/0080728 A1 | 6/2002 | Sugar et al. | |
| 2002/0129184 A1 | 9/2002 | Watanabe | |
| 2002/0167963 A1 | 11/2002 | Joa-Ng | |
| 2003/0135675 A1 | 7/2003 | Pontius et al. | |
| 2003/0139136 A1 | 7/2003 | Pattabiraman | |
| 2003/0231741 A1 | 12/2003 | Rancu et al. | |
| 2004/0022210 A1 | 2/2004 | Frank et al. | |
| 2004/0023674 A1 | 2/2004 | Miller | |
| 2004/0028003 A1 | 2/2004 | Diener et al. | |
| 2004/0028123 A1 | 2/2004 | Sugar et al. | |
| 2004/0029619 A1 | 2/2004 | Liang et al. | |
| 2004/0052272 A1 | 3/2004 | Frank | |
| 2004/0137915 A1 | 7/2004 | Diener et al. | |
| 2004/0192222 A1 | 9/2004 | Vaisanen et al. | |
| 2004/0259589 A1 | 12/2004 | Bahl et al. | |
| 2005/0047038 A1 | 3/2005 | Nakajima et al. | |
| 2005/0099943 A1 | 5/2005 | Naghian et al. | |
| 2005/0239497 A1 | 10/2005 | Bahl et al. | |
| 2005/0277387 A1 | 12/2005 | Kojima et al. | |
| 2005/0289092 A1 | 12/2005 | Sumner et al. | |
| 2006/0013176 A1 | 1/2006 | De et al. | |
| 2006/0025181 A1 | 2/2006 | Kalofonos et al. | |
| 2006/0026051 A1 | 2/2006 | Rose | |
| 2006/0089119 A1 | 4/2006 | Lipasti et al. | |
| 2006/0101033 A1 | 5/2006 | Hu et al. | |
| 2006/0126702 A1 | 6/2006 | Burdett | |
| 2006/0152335 A1 | 7/2006 | Helgeson | |
| 2006/0160563 A1 | 7/2006 | Ku | |
| 2006/0166628 A1 | 7/2006 | Anttila | |
| 2006/0233191 A1 | 10/2006 | Pirzada | |
| 2006/0292986 A1 | 12/2006 | Bitran et al. | |
| 2007/0105548 A1 | 5/2007 | Mohan et al. | |
| 2007/0124005 A1 | 5/2007 | Bourakov et al. | |
| 2007/0125162 A1 * | 6/2007 | Ghazi et al. | 73/149 |
| 2007/0135162 A1 * | 6/2007 | Banerjea et al. | 455/556.1 |
| 2007/0153702 A1 | 7/2007 | Khan et al. | |
| 2007/0165754 A1 | 7/2007 | Kiukkonen et al. | |
| 2007/0206631 A1 | 9/2007 | Parts et al. | |
| 2007/0232349 A1 | 10/2007 | Jones et al. | |
| 2007/0248114 A1 | 10/2007 | Jia et al. | |
| 2007/0255850 A1 | 11/2007 | Gould et al. | |
| 2007/0281617 A1 | 12/2007 | Meylan et al. | |
| 2008/0019339 A1 | 1/2008 | Raju et al. | |
| 2008/0045152 A1 | 2/2008 | Boes | |
| 2008/0057910 A1 | 3/2008 | Thoresson et al. | |
| 2008/0066019 A1 | 3/2008 | Worek et al. | |
| 2008/0109581 A1 | 5/2008 | Pham et al. | |
| 2008/0130580 A1 | 6/2008 | Chaponniere et al. | |
| 2008/0161041 A1 | 7/2008 | Pernu | |
| 2008/0192806 A1 | 8/2008 | Wyper et al. | |
| 2008/0200120 A1 | 8/2008 | Ruuska et al. | |
| 2008/0227456 A1 | 9/2008 | Huang et al. | |
| 2008/0232339 A1 | 9/2008 | Yang et al. | |
| 2008/0254745 A1 | 10/2008 | Zhang et al. | |
| 2008/0279137 A1 | 11/2008 | Pernu et al. | |
| 2008/0279155 A1 | 11/2008 | Pratt, Jr. et al. | |
| 2008/0287158 A1 | 11/2008 | Rayzman et al. | |
| 2008/0298643 A1 | 12/2008 | Lawther et al. | |
| 2008/0311912 A1 | 12/2008 | Balasubramanian et al. | |
| 2009/0033550 A1 | 2/2009 | Wolf | |
| 2009/0040937 A1 | 2/2009 | Xhafa et al. | |
| 2009/0046625 A1 | 2/2009 | Diener et al. | |
| 2009/0061781 A1 | 3/2009 | Zhang | |
| 2009/0116437 A1 | 5/2009 | Alexandre et al. | |
| 2009/0116573 A1 | 5/2009 | Gaal et al. | |
| 2009/0137206 A1 * | 5/2009 | Sherman et al. | 455/41.2 |
| 2009/0149135 A1 | 6/2009 | Mangold et al. | |
| 2009/0176454 A1 | 7/2009 | Chen et al. | |
| 2009/0180451 A1 | 7/2009 | Alpert et al. | |
| 2009/0196210 A1 | 8/2009 | Desai | |
| 2009/0215404 A1 | 8/2009 | Kesavan et al. | |
| 2009/0239471 A1 | 9/2009 | Tran et al. | |
| 2009/0252053 A1 | 10/2009 | Leith et al. | |
| 2009/0252128 A1 | 10/2009 | Yang et al. | |
| 2009/0257380 A1 | 10/2009 | Meier | |
| 2009/0262785 A1 | 10/2009 | Wilhelmsson | |
| 2009/0303975 A1 * | 12/2009 | Xhafa et al. | 370/338 |
| 2009/0310501 A1 | 12/2009 | Catovic et al. | |
| 2009/0310661 A1 | 12/2009 | Kloper et al. | |
| 2009/0323652 A1 | 12/2009 | Chen et al. | |
| 2010/0085951 A1 | 4/2010 | Pernu et al. | |
| 2010/0130129 A1 | 5/2010 | Chang et al. | |
| 2010/0137025 A1 | 6/2010 | Tal et al. | |
| 2010/0141399 A1 | 6/2010 | Swope | |
| 2010/0142500 A1 | 6/2010 | Sudak | |
| 2010/0153760 A1 | 6/2010 | Gupta et al. | |
| 2010/0158037 A1 | 6/2010 | Heinke et al. | |
| 2010/0197235 A1 | 8/2010 | Wilhelmsson | |
| 2010/0203832 A1 | 8/2010 | Russell et al. | |
| 2010/0241727 A1 | 9/2010 | Bourakov et al. | |
| 2010/0273426 A1 | 10/2010 | Walley et al. | |
| 2010/0273504 A1 | 10/2010 | Bull et al. | |
| 2010/0304685 A1 | 12/2010 | Wietfeldt et al. | |
| 2010/0304770 A1 | 12/2010 | Wietfeldt et al. | |
| 2010/0311455 A1 | 12/2010 | Armstrong et al. | |
| 2010/0316027 A1 | 12/2010 | Rick et al. | |
| 2010/0322287 A1 | 12/2010 | Truong et al. | |
| 2010/0329161 A1 | 12/2010 | Ylanen et al. | |
| 2010/0329162 A1 | 12/2010 | Kadous et al. | |
| 2010/0331029 A1 | 12/2010 | Linsky et al. | |
| 2011/0007680 A1 | 1/2011 | Kadous et al. | |
| 2011/0007688 A1 | 1/2011 | Veeravalli et al. | |
| 2011/0009136 A1 | 1/2011 | Mantravadi et al. | |
| 2011/0026432 A1 | 2/2011 | Gruber et al. | |
| 2011/0026458 A1 | 2/2011 | Gruber et al. | |
| 2011/0065402 A1 | 3/2011 | Kraft et al. | |
| 2011/0105027 A1 | 5/2011 | Linsky | |
| 2011/0116490 A1 | 5/2011 | Wilhelmsson et al. | |
| 2011/0199989 A1 | 8/2011 | Wietfeldt et al. | |
| 2011/0212288 A1 | 9/2011 | McClure et al. | |
| 2011/0249603 A1 | 10/2011 | Rick et al. | |
| 2011/0312288 A1 | 12/2011 | Fu et al. | |
| 2012/0034870 A9 | 2/2012 | Desai et al. | |
| 2012/0129457 A1 | 5/2012 | Linsky | |
| 2012/0213303 A1 | 8/2012 | Kadous et al. | |
| 2012/0230303 A1 | 9/2012 | Guo et al. | |
| 2012/0270595 A1 | 10/2012 | Yang et al. | |

FOREIGN PATENT DOCUMENTS

| | | |
|---|---|---|
| CN | 1592088 A | 3/2005 |
| CN | 1666189 A | 9/2005 |
| CN | 1689194 A | 10/2005 |
| CN | 1716900 A | 1/2006 |
| CN | 1741484 A | 3/2006 |
| CN | 1887018 A | 12/2006 |
| CN | 1893299 A | 1/2007 |
| CN | 101132368 A | 2/2008 |

(56) References Cited

FOREIGN PATENT DOCUMENTS

| | | |
|---|---|---|
| CN | 101170315 A | 4/2008 |
| CN | 101262254 A | 9/2008 |
| CN | 101361279 A | 2/2009 |
| CN | 101378355 A | 3/2009 |
| CN | 101453759 A | 6/2009 |
| DE | 19602535 C1 | 9/1996 |
| EP | 1220460 A2 | 7/2002 |
| EP | 1489788 A2 | 12/2004 |
| EP | 1551080 A1 | 7/2005 |
| EP | 1589781 | 10/2005 |
| EP | 1589781 A2 * | 10/2005 |
| EP | 1659814 A1 | 5/2006 |
| EP | 1681772 A1 | 7/2006 |
| EP | 1703675 A1 | 9/2006 |
| EP | 1705936 | 9/2006 |
| EP | 1705936 A2 * | 9/2006 |
| EP | 1729464 A1 | 12/2006 |
| EP | 1959619 | 8/2008 |
| EP | 2068452 | 6/2009 |
| GB | 2412817 A | 10/2005 |
| JP | S61110250 A | 5/1986 |
| JP | H05336141 A | 12/1993 |
| JP | H0721114 A | 1/1995 |
| JP | 08055495 | 2/1996 |
| JP | 9501814 A | 2/1997 |
| JP | 2003199160 A | 7/2003 |
| JP | 2003234745 A | 8/2003 |
| JP | 2003298598 A | 10/2003 |
| JP | 2004129143 A | 4/2004 |
| JP | 2005012815 A | 1/2005 |
| JP | 2005529549 A | 9/2005 |
| JP | 2005328520 A | 11/2005 |
| JP | 2006211242 A | 8/2006 |
| JP | 2007503733 A | 2/2007 |
| JP | 2007129711 A | 5/2007 |
| JP | 2007202176 A | 8/2007 |
| JP | 2007523519 A | 8/2007 |
| JP | 2008521309 A | 6/2008 |
| JP | 2008153984 A | 7/2008 |
| JP | 2008219444 A | 9/2008 |
| JP | 2009500988 A | 1/2009 |
| JP | 2009042887 A | 2/2009 |
| JP | 2009534972 A | 9/2009 |
| JP | 2010504677 A | 2/2010 |
| JP | 2010531565 A | 9/2010 |
| KR | 20040111157 A | 12/2004 |
| KR | 20060047429 A | 5/2006 |
| TW | I264209 B | 10/2006 |
| TW | 200820800 A | 5/2008 |
| TW | I309953 B | 5/2009 |
| WO | WO9422239 | 9/1994 |
| WO | 9527381 A1 | 10/1995 |
| WO | WO0230133 A2 | 4/2002 |
| WO | WO03105418 | 12/2003 |
| WO | WO2004006461 A1 | 1/2004 |
| WO | WO-2005062815 A2 | 7/2005 |
| WO | WO2007008981 | 1/2007 |
| WO | 2007063901 A1 | 6/2007 |
| WO | WO-2007083205 A2 | 7/2007 |
| WO | 2007122297 A1 | 11/2007 |
| WO | WO2007138375 | 12/2007 |
| WO | WO2008000905 | 1/2008 |
| WO | 2008024713 A2 | 2/2008 |
| WO | WO-2008041071 A2 | 4/2008 |
| WO | WO2008070777 | 6/2008 |
| WO | WO2010080669 | 7/2010 |
| WO | WO2011002795 A1 | 1/2011 |
| WO | WO2011006130 A1 | 1/2011 |
| WO | WO2011061164 A2 | 5/2011 |

OTHER PUBLICATIONS

Baghel, et al., "Coexistence Possibilities of LTE with ISM Technologies and GNSS," IEEE, 2011 International Conference on Communications, Jan. 28-30, 2011. p. 1-5.

Bluetooth Sig, Inc. "Bluetooth Specification Version 3.0 + HS, Core System Package, Part B Baseband Specification", vol. 2 Apr. 21, 2009, pp. 68-85, XP002622397, Retrieved from the Internet: URL: http://www.bluetooth.com/Specification %20Documents/Core_V30_HS.zip.

Coen Bron, et al., Algorithm 457: Finding All Cliques of an Undirected Graph, Communications of the ACM, 16(9): 575-577, 1973.

dB or not dB? Everything you ever wanted to know at decibels but were afraid to ask... Application Note 1 MA98, Oct. 2005, Rohde & Schwarz, located at http:||www2.rohde-schwarz.com|file~561311M A98-4E.

F. Cazals, C. Karande, A note on the problem of reporting maximal cliques, Theoretical Computer Science, vol. 407, Issues 1-3, Nov. 6, 2008, pp. 564-568.

Hong, et al., "Exploring muitiple radios and multiple channels in wireless mesh networks [Accepted from Open Call]", IEEE Wireless Communications, IEEE Service Center, Piscataway, NJ, US, vol. 17, No. 3, Jun. 1, 2010, pp. 76-85, XP011311811, ISSN: 1538-1284.

Juha B., et al.,"Slimbus: An Audio, Data and Control Interface for Mobile Device" Conference: 29th International Conference: Audio for Mobile and Handheld Devices; Sep. 2006, AES, 60 East 42nd Street, Room 2520 New York 10165-2520, USA, Sep. 1, 2006, XP040507958 Section 2.6.

Ramachandran, et al., "Interference-Aware Channel Assignment in Multi-Radio Wireless Mesh Networks", INFOCOM 2006, 25th IEEE International Conference on Computer Communications, Proceedings, IEEE Piscataway, NJ, Apr. 1, 2006, pp. 1-12, XP031072217, DO1: 10.1109/INFOCOMM.2006.177, ISBN: 978-1-4244-0221-2

Stefan Geirhofer, et al., "Cognitive frequency hopping based on interference prediction: theory and experimental results" Mobile Computing and Communications Review, ACM, New York, NY, US LNKD-DOI: 10.1145/1621076.1621082, vol. 13, No. 2, Apr. 1, 2009, pp. 49-61, XP001555779, ISSN: 1091-1669.

Stefan, G., et al., "Congnitive Frequency Hopping Based On Interference Prediction: Theory And Experimental Results", Mobile Computing and Communications Review, vol. 13, No. 2, pp. 49 to 51. Apr. 2009.

Taiwan Search Report—TW099121291—TIPO—Feb. 11, 2014.

* cited by examiner

CENTRALIZED COEXISTENCE MANAGER FOR CONTROLLING OPERATION OF MULTIPLE RADIOS

CROSS-REFERENCE

This application claims the benefit of U.S. Provisional Application Ser. No. 61/221,244, filed Jun. 29, 2009, and entitled "CENTRALIZED COEXISTENCE MANAGER FOR CONTROLLING OPERATION OF MULTIPLE RADIOS," the entirety of which is incorporated herein by reference.

BACKGROUND

I. Field

The present disclosure relates generally to wireless communications, and more specifically to managing coexistence between multiple radios utilized by respective devices in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and Single-Carrier FDMA (SC-FDMA) systems.

Generally, a wireless multiple-access communication system can include a number of radios to support communication with different wireless communication systems. Respective radios can operate on certain frequency channels or bands or can have respective predefined requirements. In order to manage communication via multiple radios and avoid collisions and/or interference between respective radios, it would be desirable to implement mechanisms to coordinate between respective radios that are in collision (e.g., radios configured such that their mutual operation would cause significant interference on at least one of the radios).

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying one or more transceivers and a coexistence manager (CxM) entity associated with the one or more transceivers; determining respective properties of the one or more transceivers; generating one or more configuration parameters to be utilized by the CxM entity; and providing the one or more configuration parameters to the CxM entity in connection with management of events associated with the one or more transceivers at the CxM entity based on notifications provided by the one or more transceivers.

A second aspect described herein relates to a wireless communications apparatus, which can comprise a memory that stores data relating to one or more radios and a CxM entity associated with the one or more radios. The wireless communications apparatus can further comprise a processor configured to determine respective properties of the one or more radios, to generate one or more configuration parameters based at least in part on the respective properties of the one or more radios, and to provide the configuration parameters to the CxM entity for management of events associated with the one or more radios based on notifications provided by the one or more radios.

A third aspect relates to an apparatus, which can comprise means for obtaining information relating to properties of one or more associated transceivers and means for generating configuration parameters to be utilized by an associated CxM entity in connection with management of events corresponding to the one or more associated transceivers based at least in part on the properties of the one or more associated transceivers.

A fourth aspect described herein relates to a computer program product, which can include a computer-readable medium that comprises code for causing a computer to obtain information relating to properties of one or more associated radios and code for causing a computer to generate configuration parameters to be utilized by an associated CxM entity in connection with management of events corresponding to the one or more associated radios based at least in part on the properties of the one or more associated radios.

According to a fifth aspect, a method is described herein. The method can comprise identifying one or more transceivers and a CxM entity associated with the one or more transceivers; receiving one or more configuration parameters from the CxM entity; receiving notifications of respective events from the one or more transceivers; determining whether respective events for which notifications are received can be executed concurrently based at least in part on the one or more configuration parameters; and transmitting respective responses to the one or more transceivers according to a result of the determining.

A sixth aspect described herein relates to a wireless communications apparatus, which can comprise a memory that stores data relating to one or more radios and a CxM entity associated with the one or more radios. The wireless communications apparatus can further comprise a processor configured to receive one or more configuration parameters from the CxM entity, to receive notifications of respective events from the one or more radios, to conduct a determination relating to whether respective events for which notifications are received can be executed concurrently based at least in part on the one or more configuration parameters, and to transmit respective responses to the one or more radios according to the determination.

A seventh aspect relates to an apparatus, which can comprise means for receiving a set of coexistence configuration parameters and at least one event request; means for determining whether events corresponding to the at least one event request can be executed concurrently based on the coexistence configuration parameters; and means for communicating responses to respective transceivers corresponding to the at least one event request according to a result of the determination.

An eighth aspect described herein relates to a computer program product, which can include a computer-readable medium that comprises code for causing a computer to receive a set of radio coexistence configuration parameters and at least one radio event request; code for causing a computer to determine whether radio events corresponding to the at least one radio event request can be executed concurrently based on the radio coexistence configuration parameters; and code for causing a computer to communicate responses to respective radios corresponding to the at least one radio event request according to a result of the determination.

A ninth aspect described herein relates to a system operable in a wireless communication system. The system can comprise a control plane CxM that performs an analysis for a set of transceivers and generates a set of coexistence configuration parameters according to the analysis and a data plane CxM that receives the coexistence configuration parameters from the control plane CxM, identifies event requests from the set of transceivers, conducts a determination relating to whether events for which respective event requests are received can be executed concurrently based on the event requests or the coexistence configuration parameters, and transmits respective responses to the set of transceivers according to the determination.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
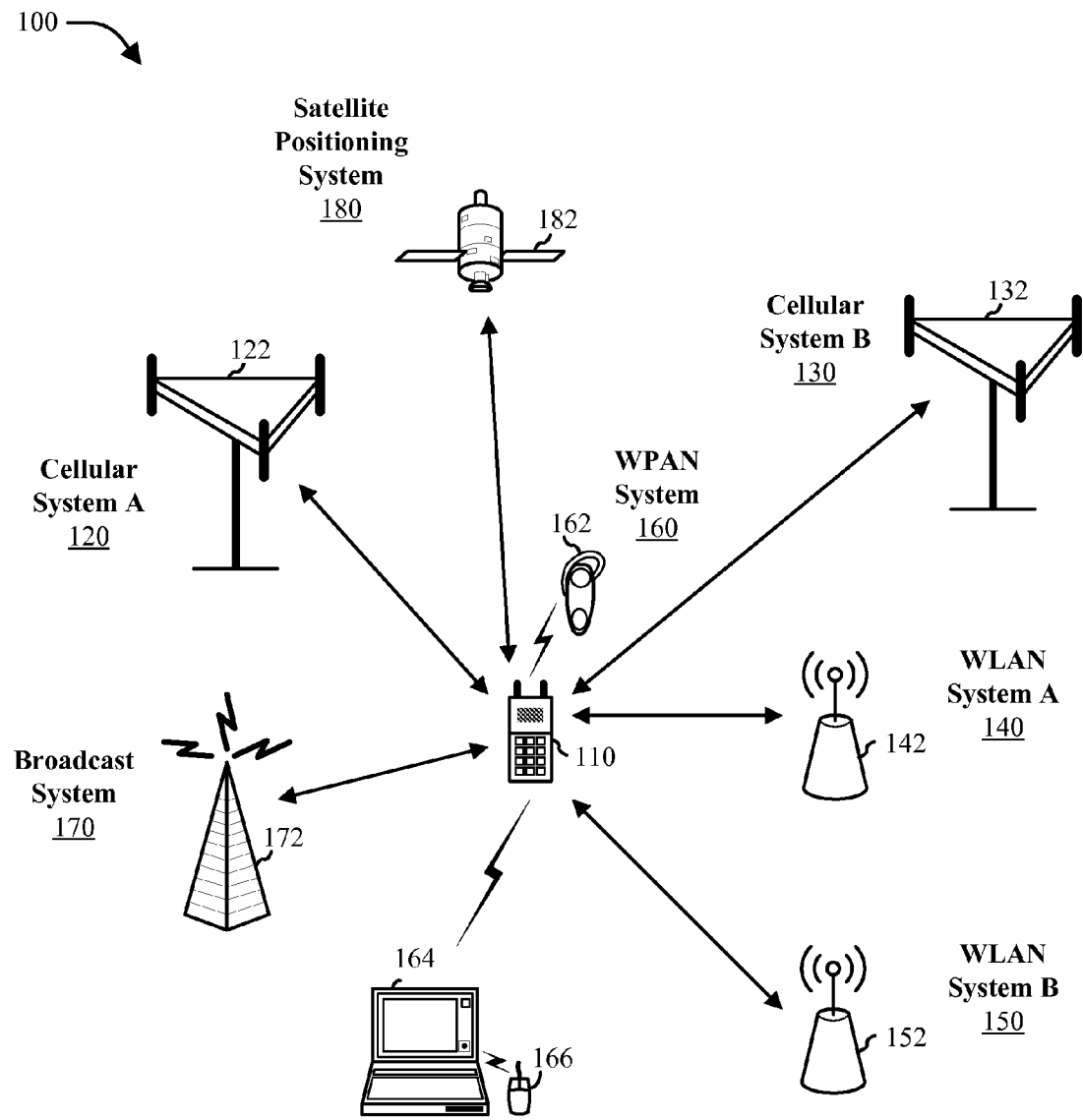
FIG. 1 is a block diagram of an example wireless communication environment in which various aspects described herein can function.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, it can be appreciated that various illustrative logical blocks, modules, circuits, algorithm steps, etc., described in connection with the disclosure herein can be implemented as electronic hardware, computer software, or combinations of both. To clearly illustrate this interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the disclosure herein can additionally or alternatively be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, or alternatively the processor can be any conventional processor, controller, microcontroller, state machine, or the like. A processor can also be implemented as a combination of computing devices, e.g., a combination of a DSP and a microprocessor, a plurality of microprocessors, one or more microprocessors in conjunction with a DSP core, or any other such configuration.

Furthermore, various functions of one or more example embodiments described herein can be implemented in hardware, software, firmware, or any combination thereof. If implemented in software, the functions can be stored on or transmitted as one or more instructions or code on a computer-readable medium. Computer-readable media can include both computer storage media and communication media. Communication media can include any medium that facilitates transfer of a computer program from one place to another. Likewise, storage media can include any available media that can be accessed by a general purpose or special purpose computer. By way of example, and not limitation, computer-readable media can comprise RAM, ROM, EEPROM, CD-ROM, digital versatile disc (DVD), blu-ray disc, or other optical disk storage, magnetic disk storage or other magnetic storage devices, and/or any other medium that can be used to carry or store desired program code means in the form of instructions or data structures and that can be accessed by a general-purpose or special-purpose computer or a general-purpose or special-purpose processor. Further, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and/or microwave, then such means are intended to be included in the definition of medium. "Disk" and "disc," as used herein, includes compact disc (CD), laser disc, optical disc, DVD, floppy disk, and blu-ray disc, where "disks" generally reproduce data magnetically while "discs" reproduce data optically (e.g., with lasers). Combinations of the above can also be included within the scope of computer-readable media.

Referring now to the drawings, FIG. 1 illustrates an example wireless communication environment 100 in which various aspects described herein can function. Wireless communication environment 100 can include a wireless device 110, which can be capable of communicating with multiple communication systems. These systems can include, for example, one or more cellular systems 120 and/or 130, one or more wireless local area network (WLAN) systems 140 and/or 150, one or more wireless personal area network (WPAN) systems 160, one or more broadcast systems 170, one or more satellite positioning systems 180, other systems not shown in FIG. 1, or any combination thereof. It should be appreciated that in the following description the terms "network" and "system" are often used interchangeably.

Cellular systems 120 and 130 can each be a CDMA, TDMA, FDMA, OFDMA, SC-FDMA, or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). In an aspect, cellular system 120 can include a number of base stations 122, which can support bi-directional communication for wireless devices within their coverage. Similarly, cellular system 130 can include a number of base stations 132 that can support bi-directional communication for wireless devices within their coverage.

WLAN systems 140 and 150 can respectively implement radio technologies such as IEEE 802.11 (Wi-Fi), Hiperlan, etc. WLAN system 140 can include one or more access points 142 that can support bi-directional communication. Similarly, WLAN system 150 can include one or more access points 152 that can support bi-directional communication. WPAN system 160 can implement a radio technology such as IEEE 802.15.1 (Bluetooth), IEEE 802.15.4 (Zigbee), etc. Further, WPAN system 160 can support bi-directional communication for various devices such as wireless device 110, a headset 162, a computer 164, a mouse 166, or the like.

Broadcast system 170 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, broadcast system 170 can include one or more broadcast stations 172 that can support one-way communication.

Satellite positioning system 180 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, satellite positioning system 180 can include a number of satellites 182 that transmit signals used for position determination.

In an aspect, wireless device 110 can be stationary or mobile and can also be referred to as a user equipment (UE), a mobile station, a mobile equipment, a terminal, an access terminal, a subscriber unit, a station, etc. Wireless device 110 can be a cellular phone, a personal digital assistant (PDA), a wireless modem, a handheld device, a laptop computer, a cordless phone, a wireless local loop (WLL) station, etc. In addition, wireless device 110 can engage in two-way communication with cellular system 120 and/or 130, WLAN system 140 and/or 150, devices within WPAN system 160, and/or any other suitable system(s) and/or device(s). Wireless device 110 can additionally or alternatively receive signals from broadcast system 170 and/or satellite positioning system 180. In general, it can be appreciated that wireless device 110 can communicate with any number of systems at any given moment.

Figure 2:
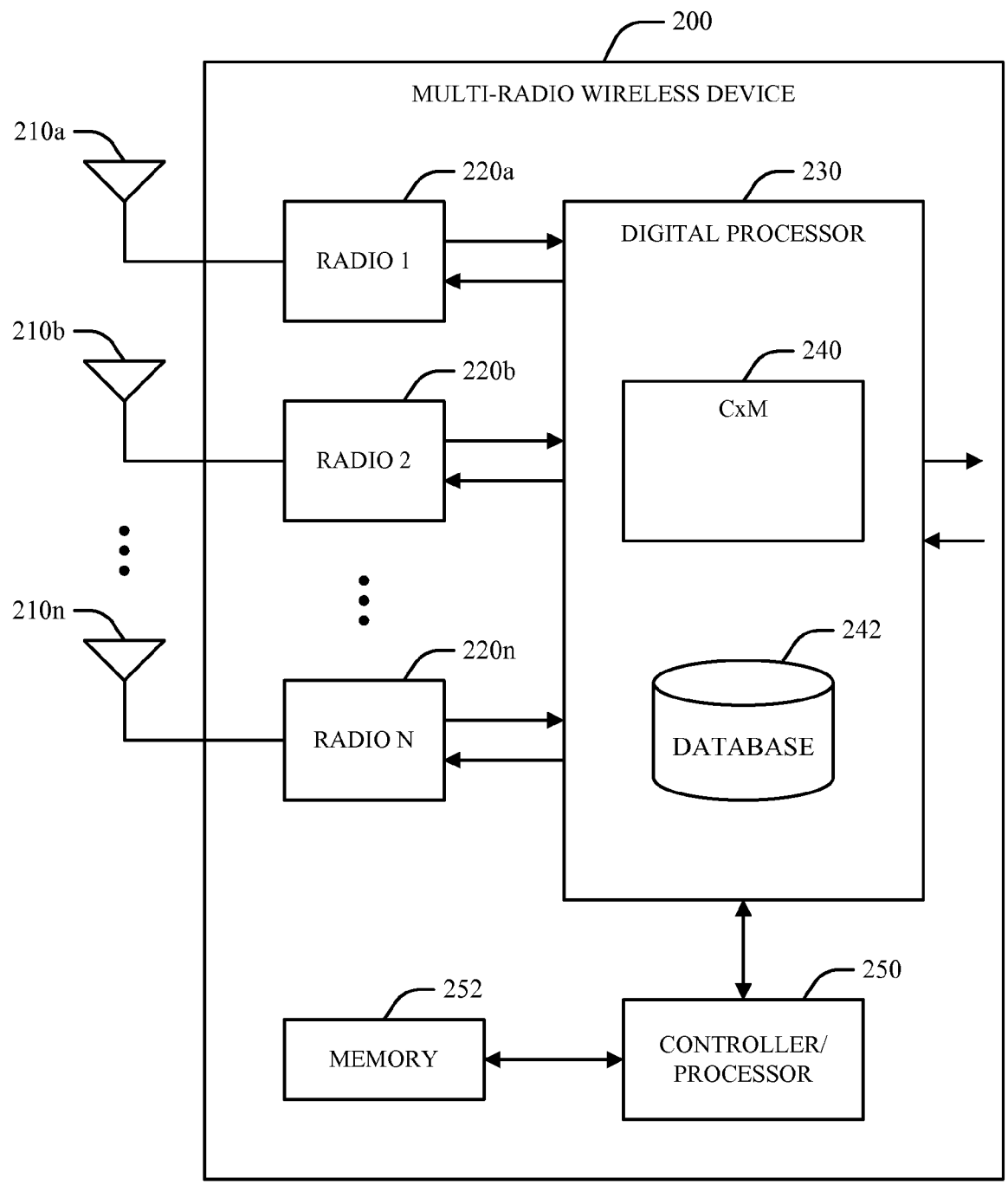
FIG. 2 is a block diagram of an example wireless device that can be operable to manage coexistence between respective radios in an associated wireless communication system in accordance with various aspects.

Turning next to FIG. 2, a block diagram is provided that illustrates an example design for a multi-radio wireless device 200. As FIG. 2 illustrates, wireless device 200 can include N radios 220a through 220n, which can be coupled to N antennas 210a through 210n, respectively, where N can be any integer value. It should be appreciated, however, that respective radios 220 can be coupled to any number of antennas 210 and that multiple radios 220 can also share a given antenna 210.

In general, a radio 220 can be a unit that radiates or emits energy in an electromagnetic spectrum, receives energy in an electromagnetic spectrum, or generates energy that propagates via conductive means. By way of example, a radio 220 can be a unit that transmits a signal to a system or a device or a unit that receives signals from a system or device. Accordingly, it can be appreciated that a radio 220 can be utilized to support wireless communication. In another example, a radio 220 can also be a unit (e.g., a screen on a computer, a circuit board, etc.) that emits noise, which can impact the performance of other radios. Accordingly, it can be further appreciated that a radio 220 can also be a unit that emits noise and interference without supporting wireless communication.

In accordance with one aspect, respective radios 220 can support communication with one or more systems. Multiple radios 220 can additionally or alternatively be used for a given system, e.g., to transmit or receive on different frequency bands (e.g., cellular and PCS bands).

In accordance with another aspect, a digital processor 230 can be coupled to radios 220a through 220n and can perform various functions, such as processing for data being transmitted or received via radios 220. The processing for each radio 220 can be dependent on the radio technology supported by that radio and can include encryption, encoding, modulation, etc., for a transmitter; demodulation, decoding, decryption, etc., for a receiver, or the like. In one example, digital processor 230 can include a coexistence manager (CxM) 240 that can control the operation of radios 220 in order to improve the performance of wireless device 200 as generally described herein. CxM 240 can have access to a database 242, which can store information used to control the operation of radios 220.

For simplicity, digital processor 230 is shown in FIG. 2 as a single processor. However, it should be appreciated that digital processor 230 can comprise any number of processors, controllers, memories, etc. In one example, a controller/processor 250 can direct the operation of various units within wireless device 200. Additionally or alternatively, a memory 252 can be used to store program codes and data for wireless device 200. Digital processor 230, controller/processor 250, and memory 252 can be implemented on one or more integrated circuits (ICs), application specific integrated circuits (ASICs), etc. By way of specific, non-limiting example, digital processor 230 can be implemented on a Mobile Station Modem (MSM) ASIC.

Figure 3:
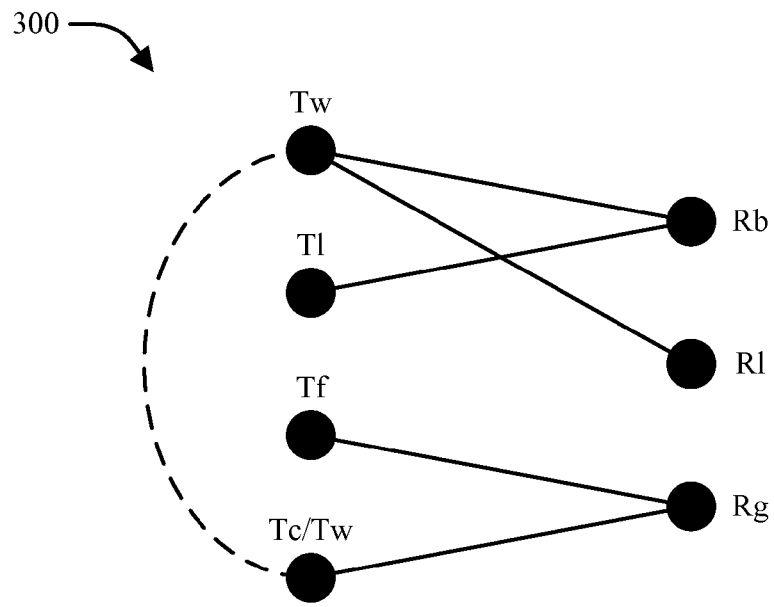
FIG. 3 illustrates an example set of radios that can be implemented in a wireless communication environment and respective potential collisions that can occur among the example set of radios.

In accordance with one aspect, CxM 240 can be utilized to manage operation of respective radios 220 utilized by wireless device 200 in order to avoid interference and/or other performance degradation associated with collisions between respective radios 220. By way of further illustration, graph 300 in FIG. 3 represents respective potential collisions between seven example radios in a given decision period. In the example shown in graph 300, the seven radios include a WLAN transmitter (Tw), an LTE transmitter (Tl), an FM transmitter (Tf), a GSM/WCDMA transmitter (Tc), an LTE receiver (Rl), a Bluetooth receiver (Rb), and a GPS receiver (Rg). The four transmitters are represented by four nodes on the left side of graph 300, and the three receivers are represented by three nodes on the right side of graph 300. A potential collision between a transmitter and a receiver is represented on graph 300 by a branch connecting the node for the transmitter and the node for the receiver. Accordingly, in the example shown in graph 300, collisions may exist between (1) a WLAN transmitter (Tw) and a Bluetooth receiver (Rb); (2) a LTE transmitter (Tl) and a Bluetooth receiver (Rb); (3) a WLAN transmitter (Tw) and a LTE receiver (Rl); (4) a FM transmitter (Tf) and a GPS receiver (Rg); and (5) a WLAN transmitter (Tw), a GSM/WCDMA transmitter (Tc), and a GPS receiver (Rg).

In accordance with another aspect, respective radios 220, such as those represented by graph 300, can impact and/or be impacted by respective other radios 220 through various mechanisms (e.g., as represented in graph 300). For example, radios 220 associated with device 200 can in some cases interfere with each other through radiative, conductive, and/or other interference mechanisms. In some cases, such interference can render some event combinations impossible or otherwise impractical to occur across different radios simultaneously. Accordingly, it can be appreciated that a substantially optimal decision on a given radio 220 (e.g., a decision regarding whether to provide a negative acknowledgement (NACK) or reduced transmit power for a WLAN transmitter radio, etc.) can in some cases depend on the status of respective other associated radios 220.

In accordance with a further aspect, a centralized radio coexistence manager (also referred to herein as a coexistence manager or CxM) can handle management of radios in the presence of potential conflicts (e.g., as illustrated by graph 300) without requiring piece-wise solutions for each pair of mechanisms. An example implementation of a centralized CxM architecture is illustrated by system 400 in FIG. 4. As shown in diagram 400, a CxM 240 that manages coexistence of a set of radios 220 can utilize a control plane CxM entity 412 and a data plane CxM entity 414 in order to manage various aspects of coexistence between radios 220 in a centralized manner.

In one example, control plane CxM entity 412 and data plane CxM entity 414 can interact with each other and with respective radios 220 to facilitate management of radios 220. For example, control plane CxM entity 412 can identify respective properties associated with one or more radios 220 and generate a set of configuration parameters based on the identified properties. Subsequently, data plane CxM entity 414 can receive and/or otherwise obtain the configuration properties and determine whether respective events associated with radios 220 in system 400 can coexist (e.g., whether the events are capable of operating substantially concurrently). Based on this determination, data plane CxM entity 414 can allow or disallow respective events at radios 220 by transmitting responses to the radios 220 and/or otherwise managing the operation of radios 220.

With respect to the operation of system 400 and respective subsequently illustrated and described systems, it should be appreciated that while respective operations are described in relation to clustering and filtering of "radios," the techniques and/or mechanisms as described herein could be applied to any suitable radio(s) or, more generally, to any suitable transceiver(s) employed within a wired communication system, a wireless communication system, and/or any other suitable communication system. Further, it should be appreciated that the hereto appended claims are not intended to be limited to any specific implementation(s) unless explicitly stated otherwise.

In accordance with one aspect, system 400 can utilize a centralized structure for CxM 240, such that respective radios 220 and/or other suitable transceivers communicate primarily with CxM 240 for management of associated radio events. For example, respective radios 220 or transceivers can inform CxM 240 with respect to their events and main related parameters, from which CxM 240 can collect respective radio events, identify potential collisions, and execute one or more algorithms tailored to respective collisions to find a resolution for the collisions. Upon obtaining a resolution, CxM 240 can communicate the resolution back to radios 220 or transceivers in the form of responses to the respective radios 220 or transceivers.

By implementing a centralized coexistence architecture as shown in system 400, it can be appreciated that various benefits can be realized. These benefits can include, for example, improved scalability (e.g., to support the addition, removal, or modification of respective radios 220 or transceivers), reduced hardware complexity, increased design flexibility, increased overall performance, or the like.

In accordance with one aspect, control plane CxM entity 412 and data plane CxM entity 414 can cooperate to provide various aspects of functionality relating to coexistence management in association with a wireless device and respective radios 220 or transceivers utilized by the device. In one example, a division of functionality between entities 412-414 can be based on timescale, such that control plane CxM entity 412 handles operations on a relatively slower timescale (e.g., sleep management, radio registration, long-term configuration, etc.), while data plane CxM entity 414 handles operations on a relatively faster timescale (e.g., processing of decisions based on incoming event notifications, etc.). In one example, control plane CxM entity 412 and data plane CxM entity 414 can be implemented using software, hardware, a combination of software and hardware, and/or any other suitable means.

In one example, control plane CxM entity 412 can control data plane functionality and/or configure the operations of data plane CxM entity 414. For example, control plane CxM entity 412 can generate one or more configuration parameters for use by data plane CxM entity 414 in managing events between respective radios 220 or transceivers. These configuration parameters can include, for example, interference tables relating to interference at respective victim radios and/or other transceivers caused by one or more transmit power levels at respective aggressor radios and/or other transceivers, relative priorities of events executable by respective radios or other transceivers, one or more protocols to be utilized for communication between data plane CxM entity 414 and respective radios 220 or other transceivers, or the like.

In one example, this configuration can be on a relatively slow pace (e.g., on the order of software cycles) and can be latency tolerant. By way of specific example, for a given software cycle, data plane CxM entity 414 can receive respective notification events (NEs) from respective radios 220 or transceivers that advertise future transmit and/or receive activities. Subsequently, data plane CxM entity 414 can utilize a simplified state machine and/or other suitable mechanisms to determine an appropriate resolution for the radios 220 or transceivers, which can be relayed back to the radios 220 or transceivers. In one example, upon receiving a resolution decision from data plane CxM entity 414, respective radios 220 or transceivers can be configured such that they are required to follow the CxM decision.

In accordance with one aspect, some or all information that is utilized to control data plane functionality of CxM 240 can be obtained from one or more higher layers via control plane CxM entity 412. For example, an upper layer entity can deem a particular radio 220 of higher priority than another depending on present traffic conditions and/or other factors. Additionally or alternatively, control plane CxM entity 412 can relay information relating to radio link quality, coexistence constraints, or the like, which can be utilized to assign flows to respective radios. In accordance with other aspects, various examples by which control plane CxM entity 412 and data plane CxM entity 414 can operate in relation to each other and/or to other associated entities are described in further detail infra.

Figure 5:
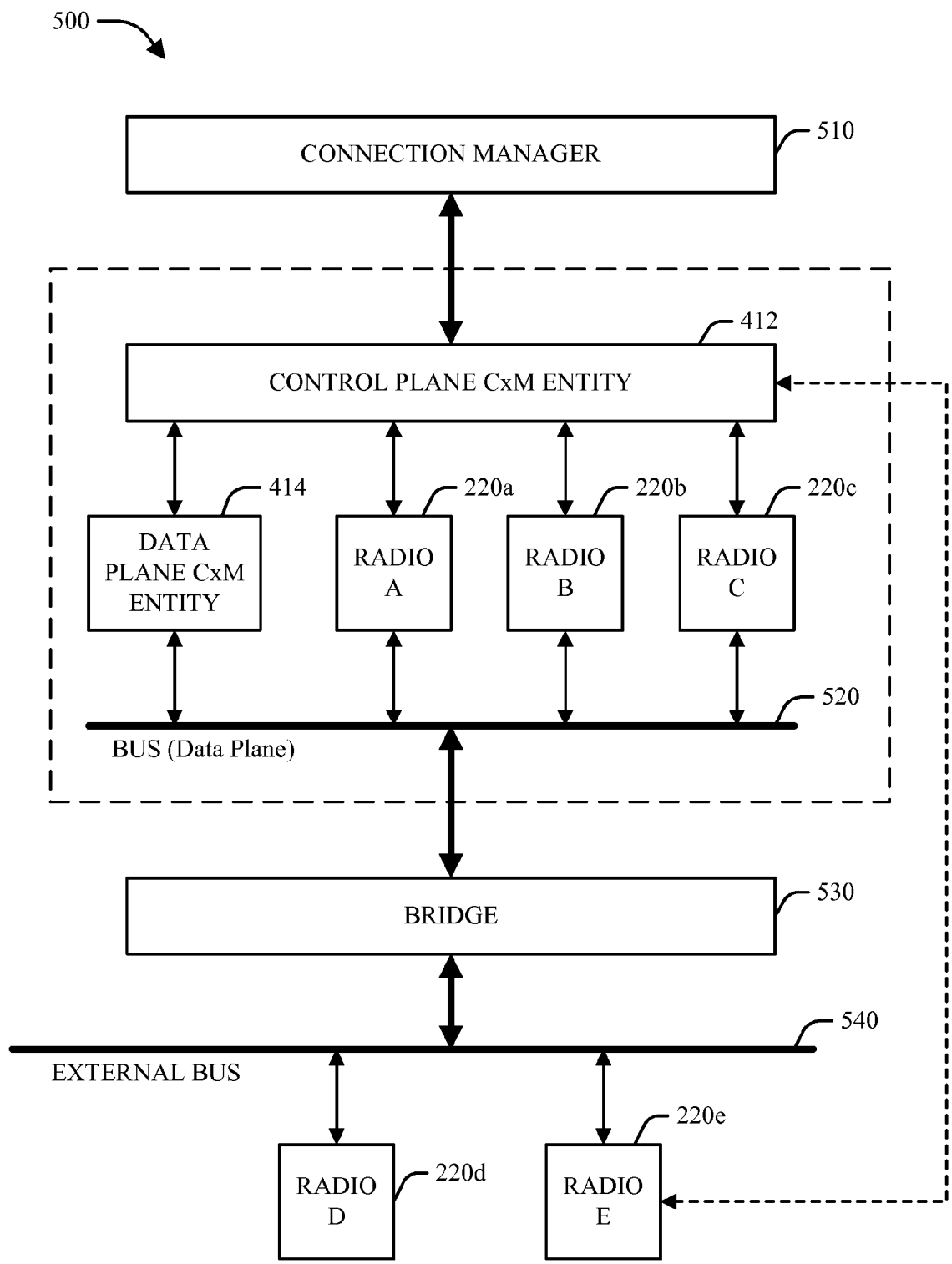
FIGS. 5-6 illustrate example radio coexistence manager architectures that can be implemented in accordance with various aspects.
Figure 6:
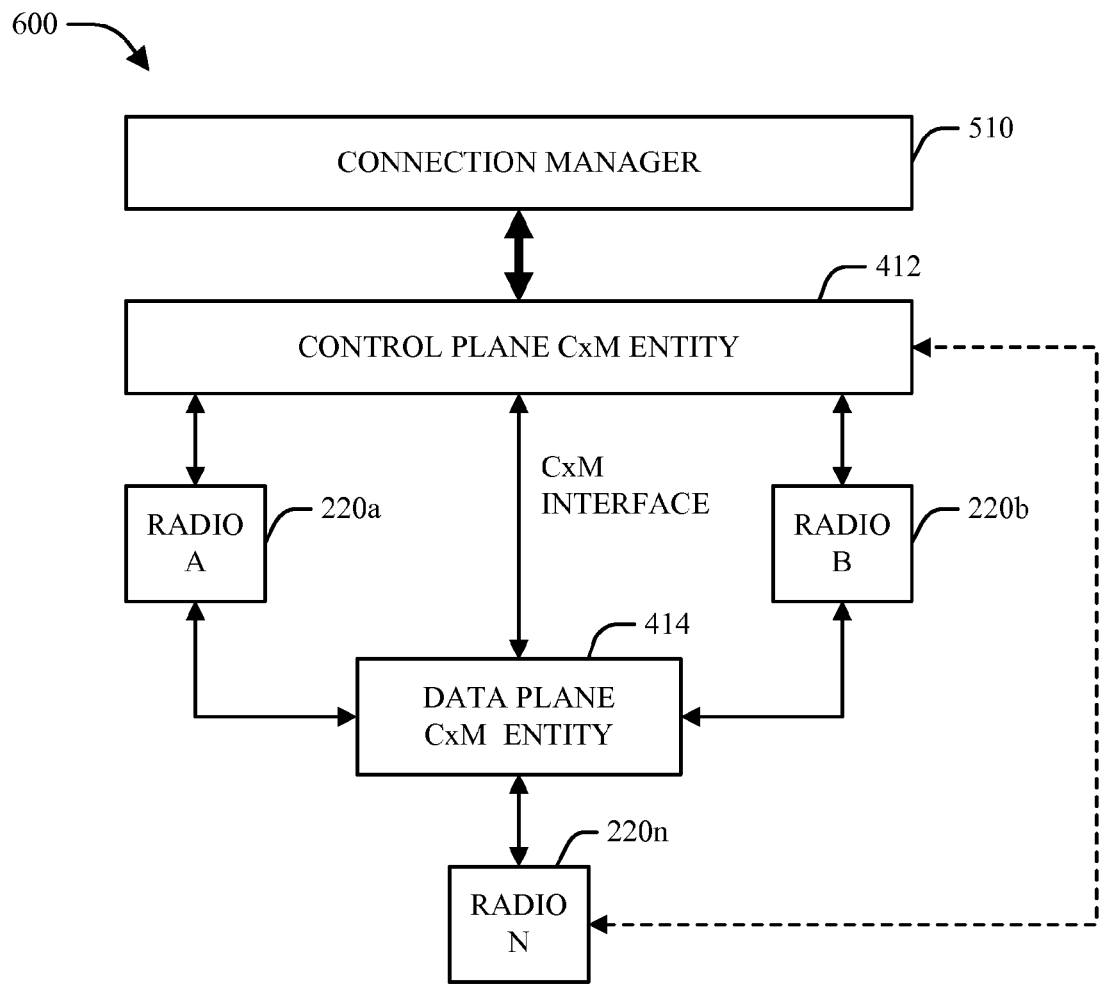

Turning next to FIGS. 5-6, provided are systems 500-600 that illustrate example centralized CxM architectures that can be implemented in accordance with various aspects. Turning first to system 500 in FIG. 5, an example architecture is illustrated that utilizes a shared bus between data plane CxM entity 414 and respective associated radios 220. In one example, control plane CxM entity 412 can be connectively coupled to a central data plane CxM entity 414, respective radios 220, and an associated connection manager (CnM) 510.

In accordance with one aspect, control plane CxM entity 412 can be implemented as a control mechanism in order to enable prioritization and resolution of radio events through a central data plane CxM entity 414. Additionally or alternatively, control plane CxM entity 412 can facilitate registration and/or configuration of individual technologies. In one example, control plane CxM entity 412 and/or its interface with data plane CxM entity 414 can operate on a substantially slower timescale than the underlying events associated with radios 220.

In accordance with another aspect, data plane CxM entity 414 can be a CxM block and/or other means that receives notifications from respective radios 220 and coordinates the radios 220 at least in part by communicating responses to the notifications back to the corresponding radios 220. For example, data plane CxM entity 414 can manage events associated with respective radios 220 by providing resolutions to events from multiple radios 220. In one example, respective radios 220 can utilize a shared bus 520 to exchange real-time information with data plane CxM entity 414. Shared bus 520 can, in turn, be associated with a bridge 530 and/or other mechanisms, from which one or more external buses 540 (and one or more radios 220 associated with such external buses 540) can be associated. In one example, data plane CxM entity 414 and/or buses 520 or 540 can operate on a substantially fast timescale as compared to the underlying events associated with radios 220.

Referring next to system 600 in FIG. 6, a second example centralized CxM architecture that can be employed is illustrated. As shown in system 600, respective radios 220 can be connected to data plane CxM entity 414. Further, configuration information for radios 220 can be provided by control plane CxM entity 412 and/or other suitable means on the control plane. Additionally or alternatively, a CxM interface can be provided for communication between control plane CxM entity 412 and data plane CxM entity 414.

In accordance with one aspect, to aid in meeting latency requirements, communications between data plane CxM entity 414 and radios 220 can be performed via a two-wire bus (e.g., with one line for clock and one line for data) and/or other suitable means. In another example, communication between radios 220 and control plane CxM entity 412 can be conducted via software messaging, a hardware bus structure (e.g., at time intervals at which notifications are not sent), or the like.

Figure 7:
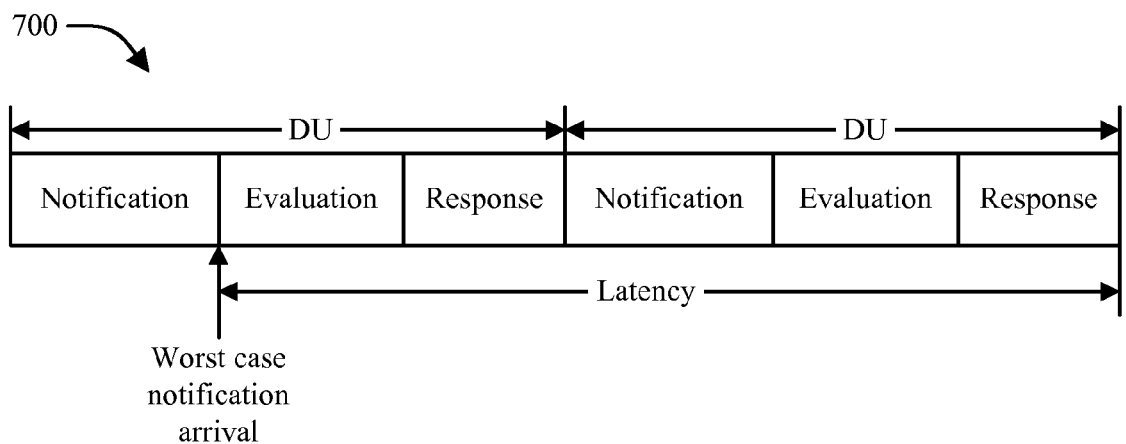
FIG. 7 illustrates operation of an example coexistence manager in time in accordance with various aspects.

Turning to diagram 700 in FIG. 7, an example timeline for CxM operation is illustrated. In one example, a CxM can operate according to a timeline divided into decision units (DUs) in time, which can be any suitable uniform or non-uniform length (e.g., 100 μs). By way of specific example, a DU can be divided into a notification phase (e.g., 50 μs) where various radios send notifications of imminent events, an evaluation phase (e.g., 30 μs) where notifications are processed, and a response phase (e.g., 20 μs) where commands are provided to various radios and/or other operations are performed based on actions taken in the evaluation phase. Various examples of techniques that can be implemented by a CxM and/or related radios during the respective phases provided above are described in further detail infra. In one example, timeline 700 can have a latency parameter defined by the worst case operation of timeline 700, e.g., the timing of a response in the case that a notification is obtained from a given radio immediately following termination of the notification phase in a given DU.

Figure 8:
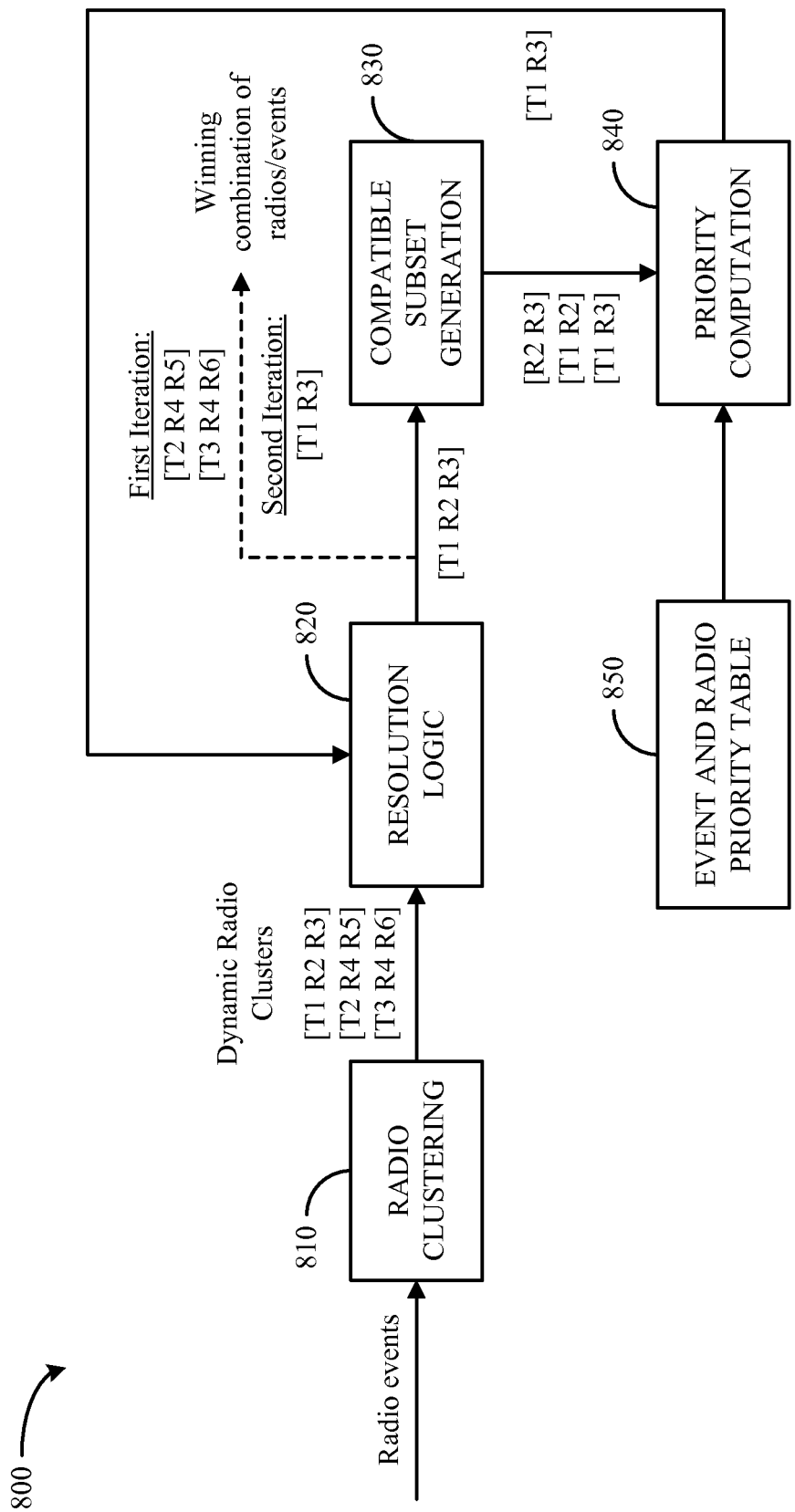
FIGS. 8-10 illustrate example architectures for a data plane radio coexistence manager implementation in accordance with various aspects.
Figure 9:
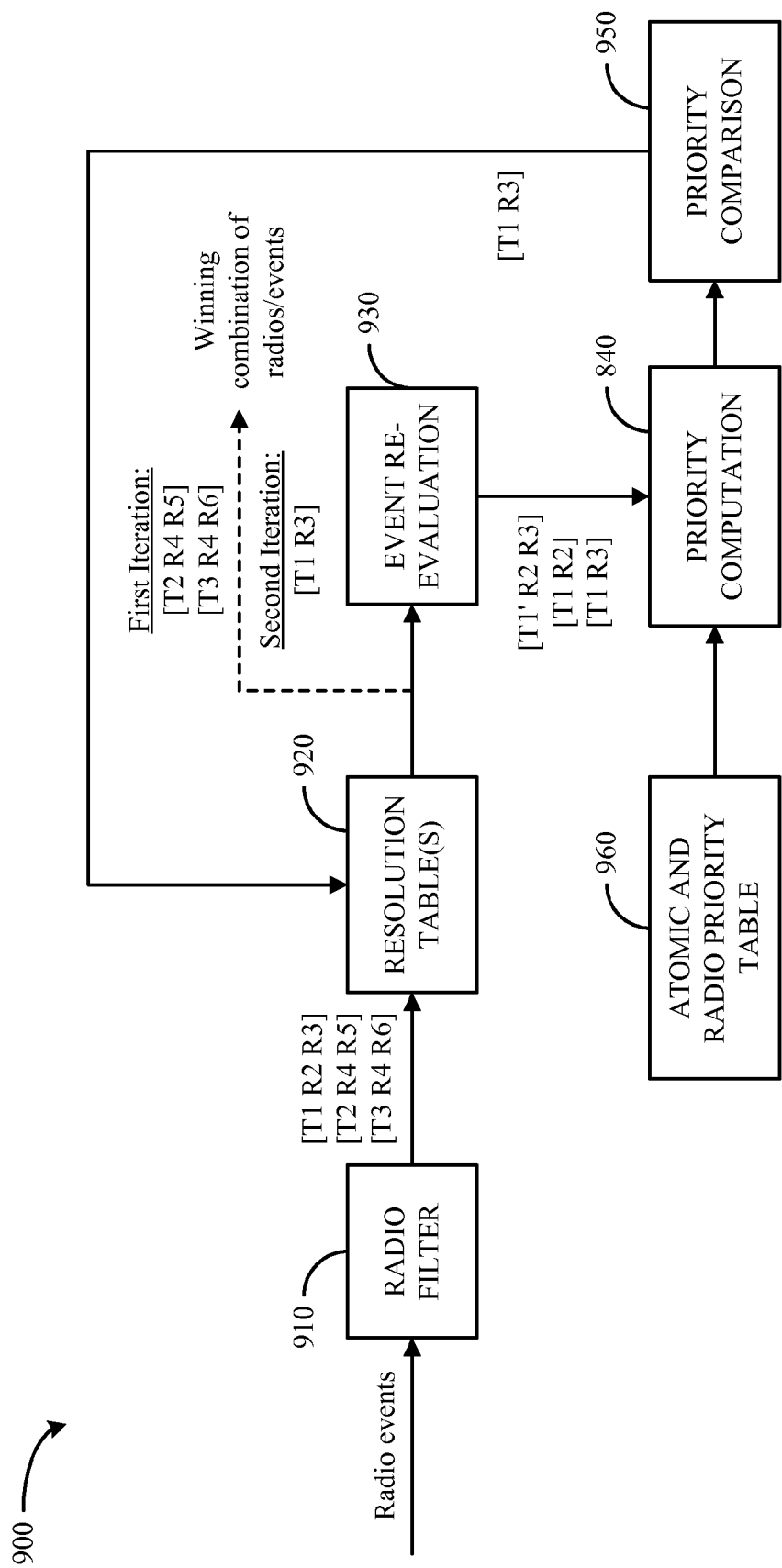
Figure 10:
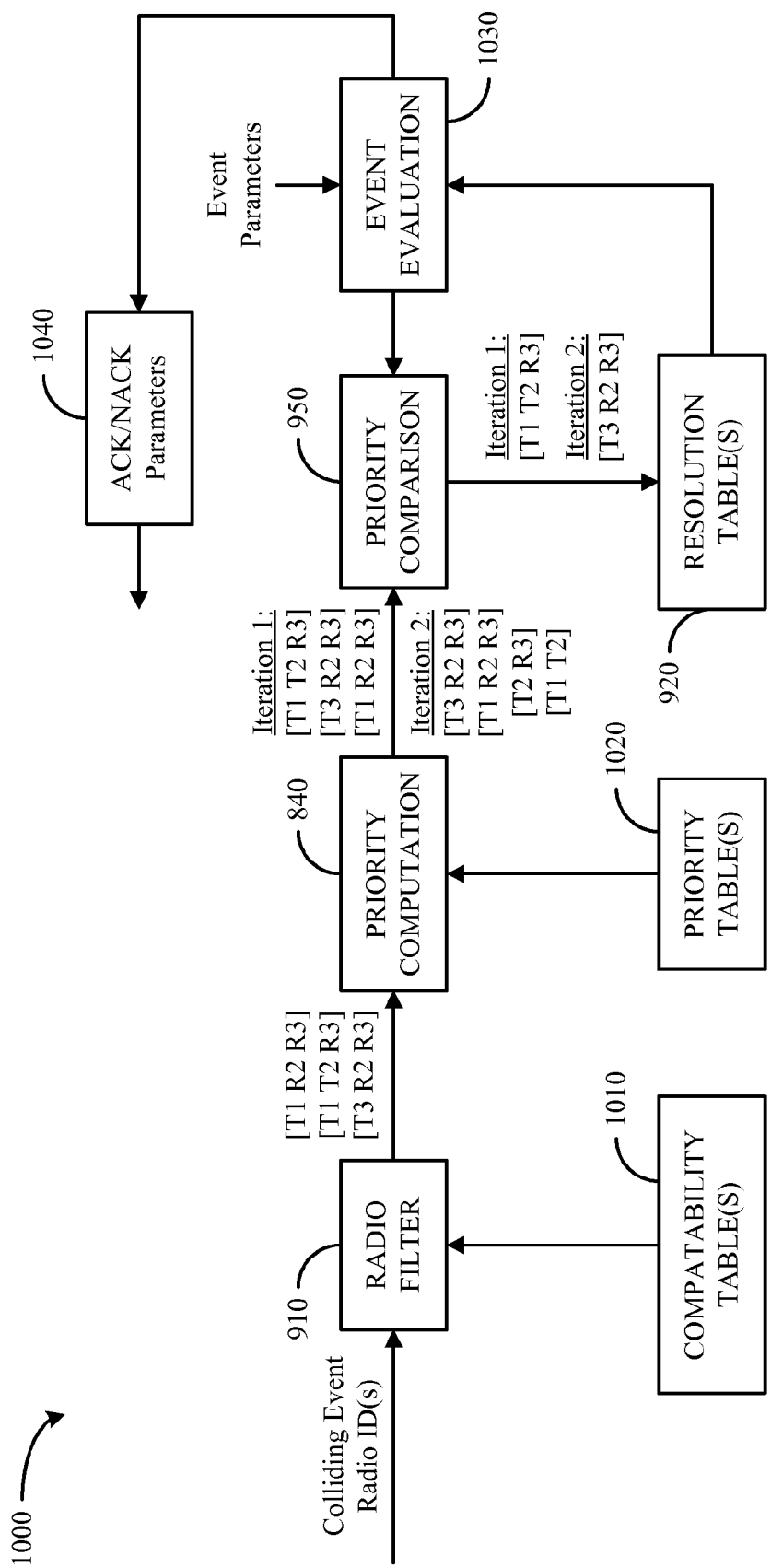

With reference next to FIGS. 8-10, respective systems 800-1000 are provided that illustrate various manners in which data plane CxM entity 414 can be implemented. It should be appreciated, however, that systems 800-1000 are provided by way of specific, non-limiting example and that any suitable implementation(s) could be utilized for data plane CxM entity 414 and/or other suitable entities as described herein. Further, it should be appreciated that unless explicitly stated otherwise, the hereto appended claims are not intended to be limited to any specific implementation or combination thereof.

With respect to systems 800-1000 and the illustrations and descriptions that follow, the following definitions are utilized. With respect to the term "events," an event as used herein is conveyed by respective radios 220 to CxM 240 and can be characterized by parameters such as priority, start time and/or periodicity, duration, deadline, and/or other factors such as power level, associated frequencies, or the like. Further, with respect to the term "priorities," respective events can be assigned a priority by CxM 240, respective radios 220 and/or transceivers, and/or any other suitable entity or entities as described herein. As used herein, priorities can have globally defined meanings such that events from multiple technologies with the same priority have equal importance. In one example, priorities can be changed by CxM 240 dynamically; thus, by way of example, the priority of an event can be configured to increase as the deadline approaches. Moreover, the term "composite priority" refers to the priority of a combination of events within a radio or for combinations of radios.

Further, events as used herein can have multiple sub-events defined within them. As used herein and generally in the art, the distinction between an "event" and a "sub-event" is motivated by resolvability, priority, and/or other factors. Resolvability refers to the concept that respective events are independently resolvable at CxM 240 and implementable at a radio 220 while sub-events are not resolvable, and priority refers to the concept that the priority of an event depends on the priorities of its constituent sub-events.

As additionally used herein, a radio cluster is a minimal set of transmit and/or receive radios 220 that can be independently resolved (e.g., resolved such that their resolutions do not depend on events from radios outside the cluster). Moreover, a compatible radio combination as used herein is defined as a combination of radios 220 that can co-exist (e.g., with potential parameter modifications). Absolutely compatible radios are defined herein as a combination of radios 220 that can coexist at substantially all power levels and frequencies of the constituent radios 220, while absolutely incompatible radios are defined herein as a combination of radios 220 that cannot or not allowed to be simultaneously active under substantially any circumstances.

Turning now to system 800 in FIG. 8, a first example data plane CxM implementation is illustrated. As shown in system 800, received radio events in a given DU are first passed by a filtering process through a radio clustering block 810. In one example, radio clustering block 810 can divide the radio events into respective clusters such that events in the same cluster can potentially collide while those in different clusters do not collide. Based on radio clusters generated by radio clustering block 810, one or more following operations in system 800 can be performed per cluster. In one example, piecewise collisions between respective radios can be provided as input to radio clustering block 810.

Next, a set of dynamic radio clusters generated by radio clustering block 810 can be passed to a resolution logic block 820, which can attempt to find a solution for coexistence within the respective clusters. In the event that a coexistence solution can be found for a given cluster, operation of system 800 can complete for that cluster. Thus, as shown in system 800, resolution can be utilized to find a coexistence solution for clusters [T2 R4 R5] and [T3 R4 R6]. However, in the event that a coexistence solution is not found for a cluster (e.g., [T1 R2 R3]), the cluster can be broken into its constituent events for further processing. This can be performed by subsequent blocks as described below.

In accordance with one aspect, resolution logic 820 can utilize an exhaustive lookup table (LUT) with entries corresponding to all combinations of radios in all potential clusters. Alternatively, a progressive resolution (PR) graph can be utilized, wherein nodes are defined for respective combinations of radio frequency (RF) knobs, power levels, interference levels, frequency sub-bands, etc., associated with respective radios (e.g., denoted by parameters of the radios) that can lead to a potential resolution and connections between parameters in respective radios are defined if the corresponding settings allow the radios to coexist. In such an example, an overall resolution can be obtained by finding a connected component of the graph, as traversing the connected component would lead to a set of parameter settings that allows the whole composite event to coexist. In one example, the input to a resolution graph constructed in this manner can include pairwise resolutions between various parameters of respective radios.

Upon processing by resolution logic 820, respective clusters for which a resolution is not initially found can be further passed through a compatible subset generation (CSG) block 830, which can find the compatible subsets of a composite event corresponding to a cluster that cannot be jointly allowed. Upon generation of such subsets, the respective subsets can be provided to a priority computation block 840. As it can be appreciated that subsets generated by CSG block 830 for a given cluster are mutually exclusive, priority computation block 840 can select a subset to grant from the mutually exclusive subsets. In one example, a choice between subsets as performed by priority computation block 840 can be based on priorities of the respective subsets (e.g., based on information provided by an event and radio priority table 850 or the like).

In accordance with one aspect, as different subsets can contain different radios, priority computation block 840 can normalize the priorities of respective radio events by dividing the events into bins such that, for example, events in the same bin are substantially the same priority across radios. For example, bins can be created for acquisition bins from all radios, radio events that lead to a connection loss, and so on. While binning provides a form of coarse prioritization, however, it can be appreciated that more than one subset can have events falling in the same bin. In this case, priority computation block 840 can arbitrate the events to meet long-term grant targets based on relative priorities assigned to the bins.

In accordance with another aspect, system 800 can operate in an iterative manner to provide confirmation that a selected subset of radio events can coexist. In one example, the operation of CSG block 830 can be configured such that coexistence of respective generated subsets is not guaranteed. For example, if CSG block 830 utilizes a simple subset generation algorithm, generated subsets can be passed back to resolution logic 820 to determine whether the events in the subsets can actually coexist. If the events cannot coexist, the subset can be discarded. Alternatively, if CSG block 830 is configured to generate only subsets that are guaranteed to coexist, this iterative process can be omitted.

Turning next to system 900 in FIG. 9, a second example data plane CxM implementation is illustrated. As shown in FIG. 9, system 900 can include a radio filter 910, resolution table(s) 920, and an event re-evaluation block 930, which can perform in a similar manner to radio clustering block 810, resolution logic 820, and CSG block 830, respectively, in system 800. In accordance with one aspect, operation of priority computation block 840 in system 900 can be divided between priority computation block 840 and a separate priority comparison block 950. For example, priority computation block 840 can determine relative priorities of radio events and/or radio event subsets (e.g., based on information from an atomic and radio priority table 960), based on which priority comparison block 950 can compare the computed priorities and arbitrate between respective events and/or event subsets as necessary.

FIG. 10 is a diagram of a system 1000, which illustrates a third example data plane CxM implementation that can be implemented in accordance with various aspects described herein. As shown in system 1000, IDs of radios associated with colliding events can be provided to a radio filter 910. In one example, radio filter 910 can utilize one or more compatibility tables 1010. A compatibility table 1010 can be, for example, physically part of one or more resolution tables 920 and/or based on other suitable means. Compatibility table 1010 can include, for example, information corresponding to respective radios corresponding to potential clusters (e.g., 1-bit indicators for each combination of radios in a cluster to indicate whether or not the combination of radios is possible).

Upon successful filtering, respective radio clusters can be provided to a priority computation block 840, which can utilize one or more priority tables 1020 or the like to compute priority values for respective events in the clusters as generally described above. A priority comparison block 950 can subsequently be utilized to select a highest priority radio event combination, based on which resolution table(s) 920 and/or an event evaluation block 1030 can determine whether the selected combination can coexist. Based on a determination by event evaluation block 1030, a set of notifications, such as ACK/NACK parameters 1040, can be generated. In one example, resolution and priority analysis can be conducted in an iterative manner in system 1000 in a similar manner to that described above with respect to systems 800-900.

In accordance with one aspect, the data plane implementations illustrated by systems 800-1000 above can operate under various assumptions. For example, it can be assumed that the priority of a composite event is determined in the data plane based solely on the constituent radio IDs and event IDs corresponding to the composite event and not other parameters. Further, it can be assumed that if a set of radios is compatible, any subset of those radios is also compatible. Moreover, it can be assumed that the composite priority of a radio event combination is greater than or equal to that of all subsets contained within the radio event combination.

Figure 4:
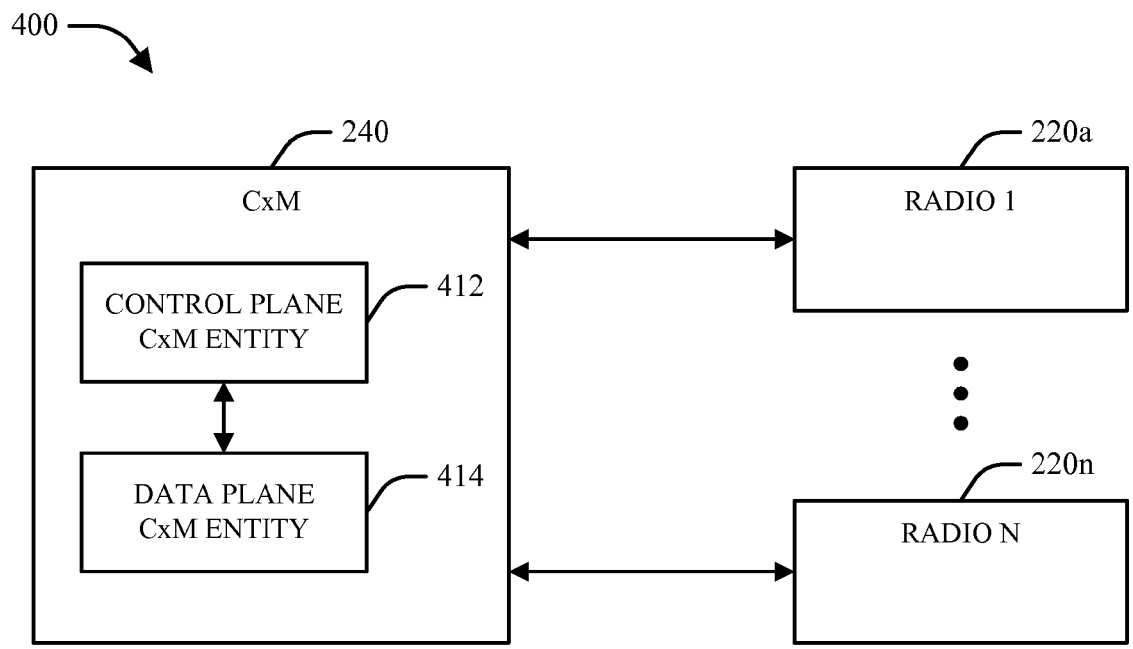
FIG. 4 is a block diagram of a system that facilitates a centralized architecture for radio event management in a multi-radio communication environment in accordance with various aspects.

Returning to system 400 in FIG. 4 and diagram 700 in FIG. 7, it can be appreciated that respective radios 220 can transmit event notifications to data plane CxM entity 414 on the notification period of a DU, based on which data plane CxM entity 414 can provide corresponding responses during the response period of the DU. In one example, notifications from radios 220 to CxM 240 can be provided based on a slotted mode, wherein notifications by a given radio 220 are transmitted on a predefined slot in time within the notification period of a DU. A slot assigned to a given radio 220 can be static or dynamic, and can be based on an ID of the radio and/or other suitable factors. Similarly, responses from CxM 240 to radios 220 can be provided using a slotted mode. Additionally or alternatively, notifications and/or responses communicated through system 400 can be provided in a broadcast fashion. For example, CxM 240 can facilitate increased response efficiency by broadcasting respective responses to radios 220 such that respective radios 220 can obtain information corresponding to substantially all responses and identify respective responses that impact the respective radios 220.

In accordance with one aspect, during the notification segment of a DU, any radio 220 having a future event can send a message to CxM 240 identifying information such as whether the event is for transmission or reception, the DU index at which the event starts, the DU index at which the event ends, and/or any other physical layer (PHY), medium access control (MAC), and/or other information (e.g., event power level, channel information, bandwidth information, quality of service (QoS) parameters, etc.) that can assist CxM 240 in making an educated decision. In one example, when not utilized for notification, resources associated with event notifications can be used to transmit other information that can aid the functionality of CxM 240, such as received signal strength indication (RSSI) values, mode change parameters, or the like.

In one example, a notification payload that can be utilized for a wide area network (WAN) radio is shown in Table 1 below.

TABLE 1

Example notification event format for a WAN radio.

| Field | # Bits | Comments |
| --- | --- | --- |
| Packet ID | 2 | To indicate whether the packet is for notification or support information |
| Initial DU | 7 | DU index where the event starts |
| Final DU | 7 | DU index where the event ends |
| Number of Events | 2 | A total of 4, 2 for transmit and 2 for receive |
| For each event: | | |
| Event ID | 2 | Captures transmit or receive |
| Event type | 4 | Depends on event composition |
| Transmit power/ Interference tolerated | 4 | Minimum power needed or maximum interference level tolerated |
| Sub-band | 3 | For example, for a 20 MHz channel bandwidth this field can index 5 MHz granularity |
| Reserved | 2 | For future use if needed |
| Total | 72 | |

As shown in the above table, the packet ID field indicates whether a packet is for notification or for other information to support CxM functionality. Further, the starting point and the duration of a corresponding event are captured through the first two fields using, e.g., 7-bit initial and final DU indices (e.g., with a wraparound every 128 DUs). In one example, the number of bits in the DU index fields can be based on the expected maximum length of a given event of the corresponding radio. Accordingly, it can be appreciated that the number of bits utilized for an event notification can be radio-specific.

By way of specific example, 7 bits can correspond to an event length of approximately 12.8 ms. In general, it can be appreciated that the length of the field can be different for different radios, and CxM 240 can be configured to map the field value to an absolute DU count value to compare against events from other radios 220.

In accordance with another aspect, after collecting all notifications in a given DU, CxM 240 can run a state machine and/or perform other suitable actions in the evaluation segment of a DU to obtain a proper resolution for each coexistence issue occurring in the DU. Radios 220 can be idle with respect to CxM 240 during this segment, or alternatively radios 220 can continue to send some control information to be used later by CxM 240. In one example, CxM 240 can determine radio combinations that can be independently resolved (e.g., that do not collide) during the evaluation segment of a DU. For example, for respective radio combinations, resolutions can be obtained for respective events within each radio in the combinations. Subsequently, if some events cannot be allowed, a series of further operations can be performed. For example, composite priority of the compatible subsets of the combination can be determined, based on which a combination with maximum composite priority can be selected. A resolution can be determined for the winning combination, and if some of the events cannot be allowed then a subset with a next highest priority can be selected. In one example, this process can be repeated for up to a maximum number of iterations.

In accordance with a further aspect, after working out resolutions for respective collected events in a DU, CxM 240 can send responses to all involved radios (e.g., in a broadcast message, etc.) at the evaluation segment of the DU. In one example, responses can include resolutions (e.g., ACK with possible parameter changes, NACK, etc.) for respective events. By way of specific, non-limiting example, a format that can be utilized for responses can vary on a per-radio basis. For example, a response for a WAN radio can utilize a format as illustrated by Table 2 below.

TABLE 2

Example response format for a WAN radio.

| Field | # Bits | Comments |
|---|---|---|
| Radio ID | 4 | Index of the radio meant by the response |
| Transmit RF Knob | 5 | The transmit RF knob index (3 bits) and the corresponding setting (2 bits) |
| Receive RF Knob | 5 | The receive RF knob index (3 bits) and the corresponding setting (2 bits) |
| Sub-band ID | 2 | Only 4 levels in the radio allows sub-band scheduling control |
| Number of Events | 2 | Up to 4 events, 2 transmit and 2 receive |
| For each event: | | |
| Event ID | 2 | Event index |
| Transmit power | 4 | Adjusted transmit power for the transmit event |
| ACK/NACK | 1 | |
| Total | 380 | (Assuming 10 radios with 2 transmit events and 2 receive events each) |

Figure 11:
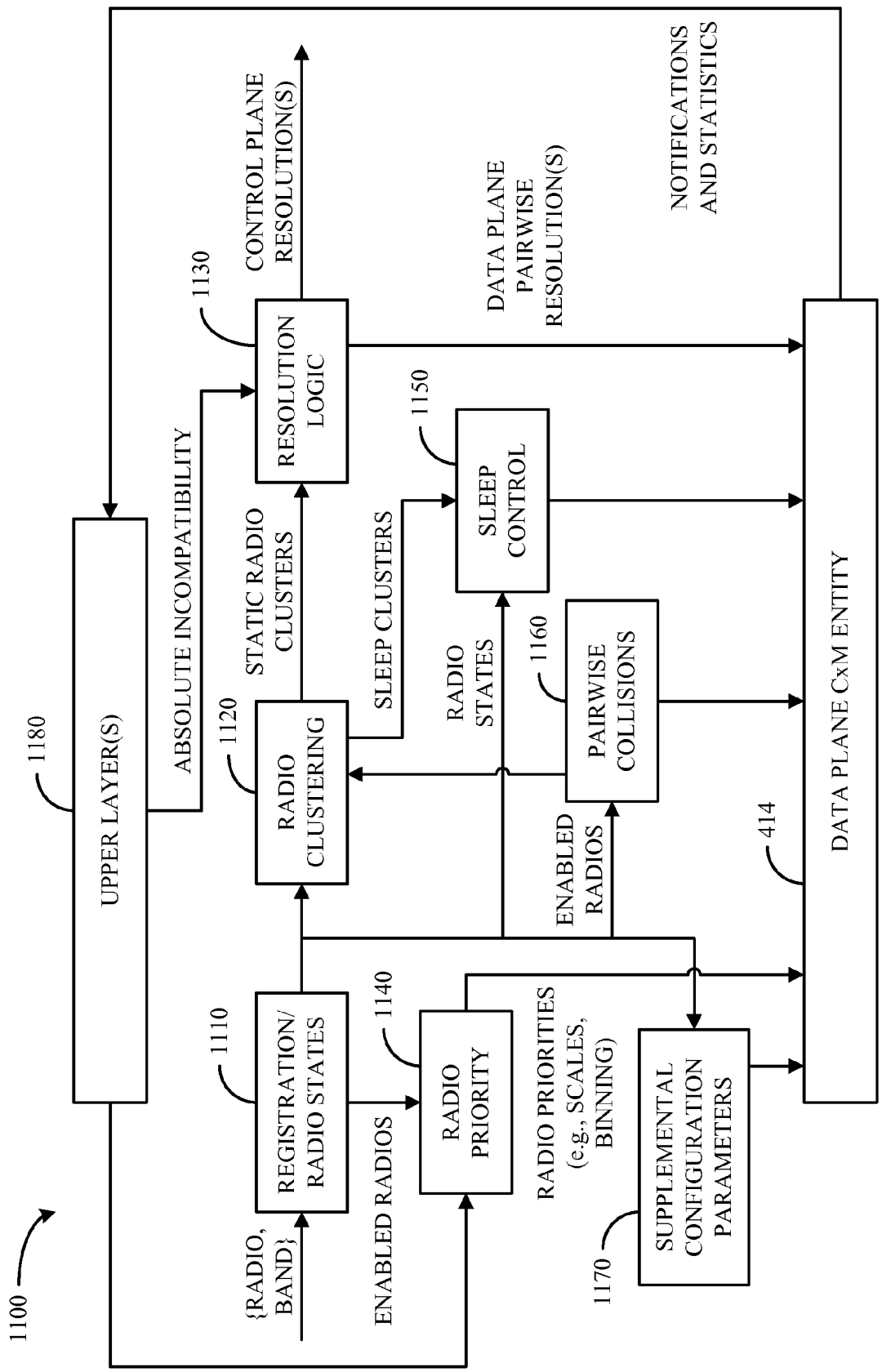
FIGS. 11-12 illustrate example architectures for a control plane radio coexistence manager implementation in accordance with various aspects.
Figure 12:
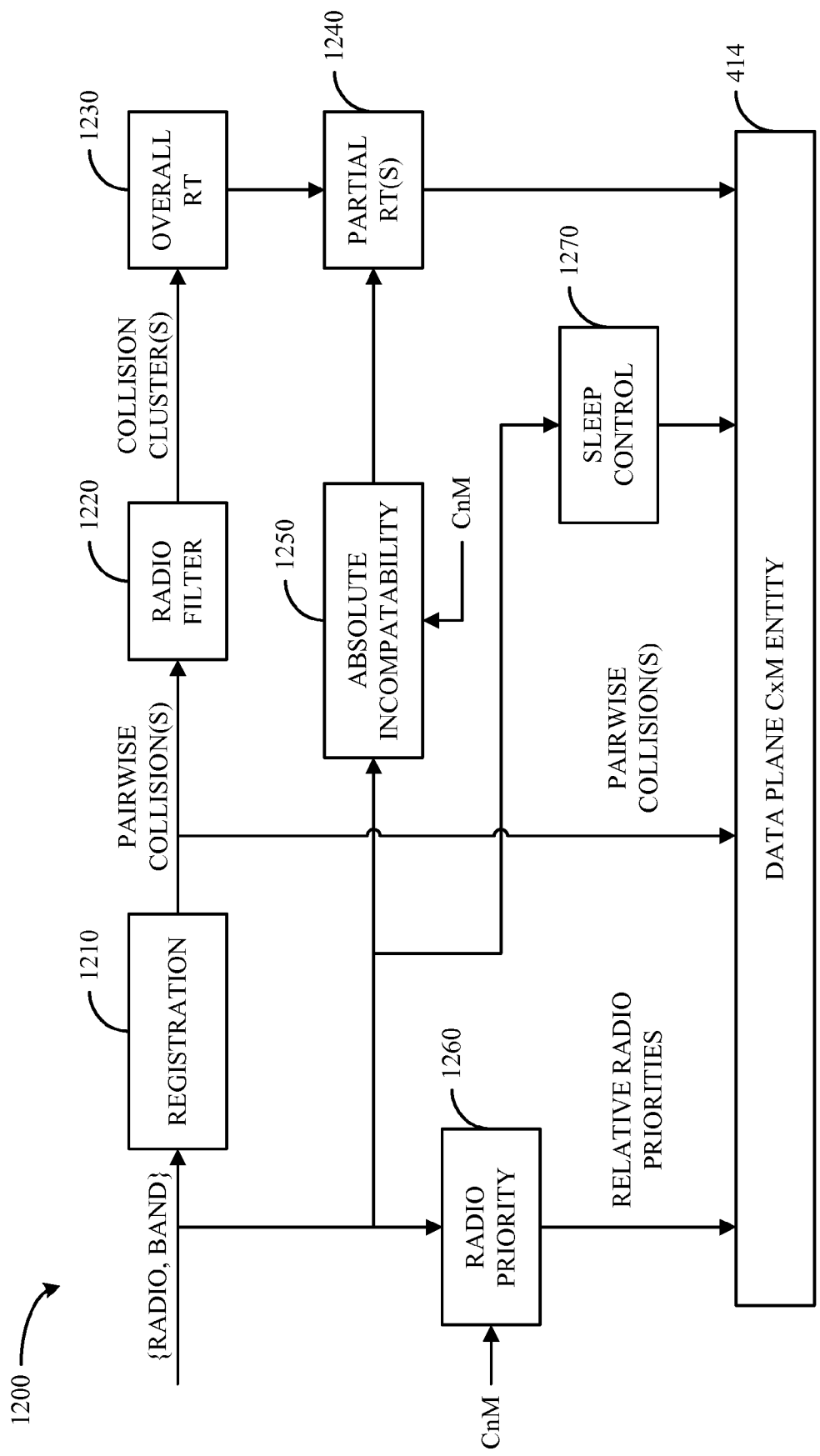

Turning next to FIGS. 11-12, respective systems 1100-1200 are provided that illustrate various manners in which control plane CxM entity 412 can be implemented. It should be appreciated, however, that systems 1100-1200 are provided by way of specific, non-limiting example and that any suitable implementation(s) could be utilized for control plane CxM entity 412 and/or other suitable entities as described herein. Further, it should be appreciated that unless explicitly stated otherwise, the hereto appended claims are not intended to be limited to any specific implementation or combination thereof.

In general, it can be appreciated that control plane CxM entity 412 can perform operations such as registering active radios (e.g., to obtain necessary static parameters such as bands, maximum transmit power, etc.); defining pairwise collisions between radios based on registrations and/or predefined rules; controlling priority computation, resolution, and/or other operations at data plane CxM entity 414; controlling the sleep mode of CxM 240; and/or other suitable operations.

With reference first to system 1100 in FIG. 11, operation of a first example control plane architecture can begin at a registration block 1100 by registering users and obtaining their updated state(s). In general, it can be appreciated that system 1100 can utilize multiple communication protocols (e.g., notification and/or response formats), different sets of supporting information (e.g., communication of RSSI in one or more formats), etc. In one example, when respective radios are turned on or otherwise enabled, they can be configured to register with registration block 1100. During such registration, system 1100 can advertise a current used protocol, based on which registration can be performed. During registration, a radio can provide one or more static parameters such as a frequency band (e.g., to define piecewise collisions), maximum transmit powers, any periodic events (e.g., periodically sent pilots) the radio utilizes, potential RF knobs of the radio, or the like. In another example, in the event that a radio changes its state (e.g., from active to sleep), it can be configured to update system 1100.

In accordance with one aspect, based on knowledge of which radios are enabled and their states, a pairwise collision block 1160 and/or other suitable means at system 1100 can determine pairwise collisions and/or pairwise resolutions (e.g., deeming some radio combinations irresolvable if needed) between radios using a predefined lookup table. In one example, this information can be passed to data plane CxM entity 414 to configure its functionality. In another example, one or more other parameters such as radio scaling factors, priority binning information, and/or acceptable costs for resolutions can also be forwarded to data plane CxM entity 414.

In one example, system 1100 can utilize a radio clustering block 1120 to define radio clustering during registration. This can be performed, for example, using information obtained from pairwise collision block 1160. For example, if pairwise collision block 1160 determines that two radios can potentially collide when operating in given bands, radio clustering block 1120 can take such information into account when determining a clustering for its associated radios.

In accordance with another aspect, system 1100 can facilitate improved power and/or interference quantization by monitoring long term (e.g., over one or more software cycles) average values. For example, system 1100 can receive average RSSI values and/or other indicators from data plane CxM entity 414, based on which averaging can be conducted. Based on this averaging, system 1100 can index power and/or interference values as increments above or below the average using the same number of bits specified in an associated notification packet format and provide this information back to the associated radios to facilitate proper quantization. By providing power and/or interference information in this manner, as opposed to providing full information corresponding to absolute power and interference levels, it can be appreciated that power and/or interference information can be provided from an understood segment of a potential range, thereby significantly reducing the amount of required overhead for such information between system 1100 and data plane CxM entity 414. In addition, it can be appreciated that providing information in the above manner can reduce the number of bits required for notifications communicated from respective radios and/or transceivers to data plane CxM entity 414 and/or provide other benefits.

In accordance with a further aspect, data plane CxM entity 414 can be provided with radio priority information via a radio priority block 1140. Such information can include relative priorities of respective radios, priorities of respective constituent atomic events, or the like. In another example, resolution logic 1130 can provide data plane CxM entity 414 with a resolution table corresponding to respective associated radios. In a further example, system 1100 can provide one or more supplemental configuration parameters 1170, such as power backoff thresholds, timeout information, bin mapping information, or the like, to data plane CxM entity 414. In yet another example, a sleep control block 1150 and/or other suitable mechanisms within 1100 can control sleep functionality of system 1100 and/or data plane CxM entity 414.

In accordance with a further aspect, system 1100 in some cases can collect and analyze information obtained from data plane CxM entity 414 and utilize such information along with clusters generated by radio clustering block 1120 to generate long-term resolutions between radios via resolution logic 1130 and/or other suitable means. For example, if one or more radios are latency tolerant and allow coexistence solutions on a relatively slow scale (e.g., on the scale of software cycles), resolution procedures can be performed by resolution logic 1130 that are similar to those that can be performed by data plane resolution logic. In one example, long-term resolutions can also be conducted by system 1100 in the event that conflicts between respective radios are found to occur at above a threshold frequency (e.g., as determined based on event conflict data obtained from data plane CxM entity 414).

In the other direction, data plane CxM entity 414 can send information to be used by system 1100 and/or upper layer(s) 1180. For example, data plane CxM entity 414, having visibility to the radios, can provide information relating to the link quality of respective radios (e.g., including the coexistence impact on or by the radios). This information can be used by an associated CnM and/or other mechanisms in defining traffic to place on respective radios. In another example, data plane CxM entity 414 can send additional information to optimize CxM performance. For example, passing respective notification events can assist system 1100 in identifying particular receiver RSSI values, average TX power on respective transmitters, or the like, which can assist in creating relatively long-term solutions such as inter-frequency handoff on one radio or selection of a discontinuous transmission (DTX)/discontinuous reception (DRX) setting that can minimize collisions. Meanwhile, it can be appreciated that forwarding resolutions can assist system 1100 in determining a pattern of resolutions that repeat. In one example, such resolutions can be cached and used without requiring traversal of the whole CxM path every time a periodic collision occurs.

In another aspect, system 1100 can facilitate interaction with one or more entities associated with upper layer(s) 1180. By way of example, system 1100 can provide respective information to upper layer(s) 1180, which in turn can utilize a connectivity engine and/or other means to identify whether it is utilizing an application on a radio with a coexistence issue and, if so, to decide whether to move that application to another radio. Additionally or alternatively, system 1100 and upper layer(s) 1180 can coordinate with respect to any suitable operation(s) (e.g., changes in radio technology, etc.). In another example, upper layer(s) 1180 can provide information to be utilized by system 1100 in managing radio coexistence. Thus, by way of example, upper layer(s) 1180 can provide information to system 1100 relating to how to set relative priorities between radios, such that factors such as applications to be utilized, operating interferences, etc., can be considered in setting the priorities for different radios. In this manner, it can be appreciated that system 1100 can act as a conduit to take priorities from upper layer(s) 1180 and to generate and/or set one or more configuration parameters for data plane CxM entity 414 based on such priorities and/or other information from upper layer(s) 1180.

FIG. 12 illustrates a system 1200 which can be utilized as an alternative control plane CxM implementation. As shown in FIG. 12, system 1200 can include a registration block 1210, a radio filter 1220, a radio priority block 1260, and a sleep control block 1270, which can function in a similar manner to that described above with respect to system 1100. In addition, system 1200 can maintain an overall resolution table (RT) 1230 as well as a set of partial RTs 1240, which can collectively function in a similar manner to resolution logic 1130 in system 1100. As further shown in system 1200, operation of a control plane CxM implementation with respect to data plane CxM entity 414 can further leverage absolute incompatibility data 1250, which can be obtained from one or more upper layer entities and/or by other suitable means.

Figure 13:
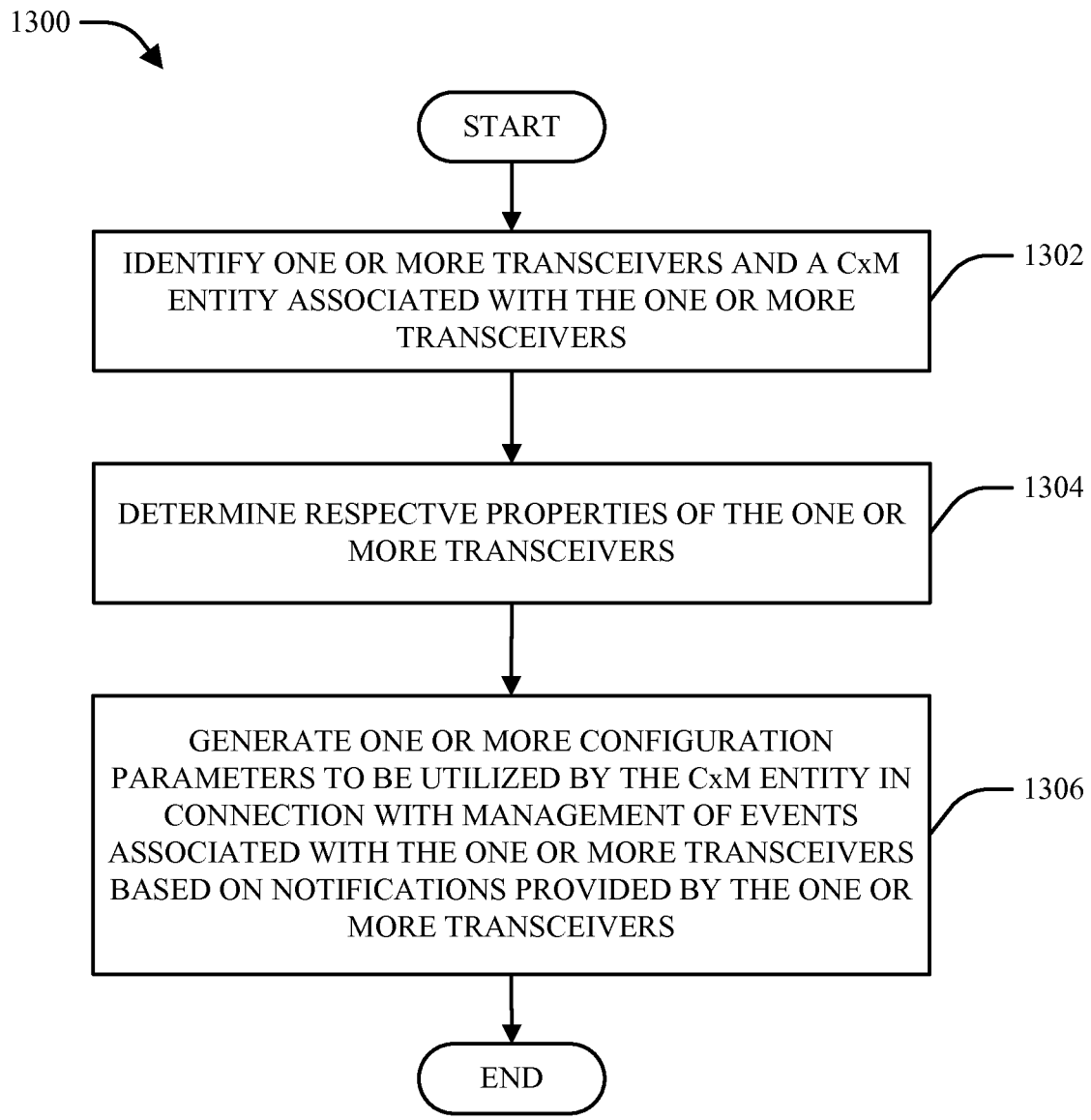
FIGS. 13-15 are flow diagrams of respective methodologies for managing coexistence between multiple transceivers associated with a communications device.
Figure 14:
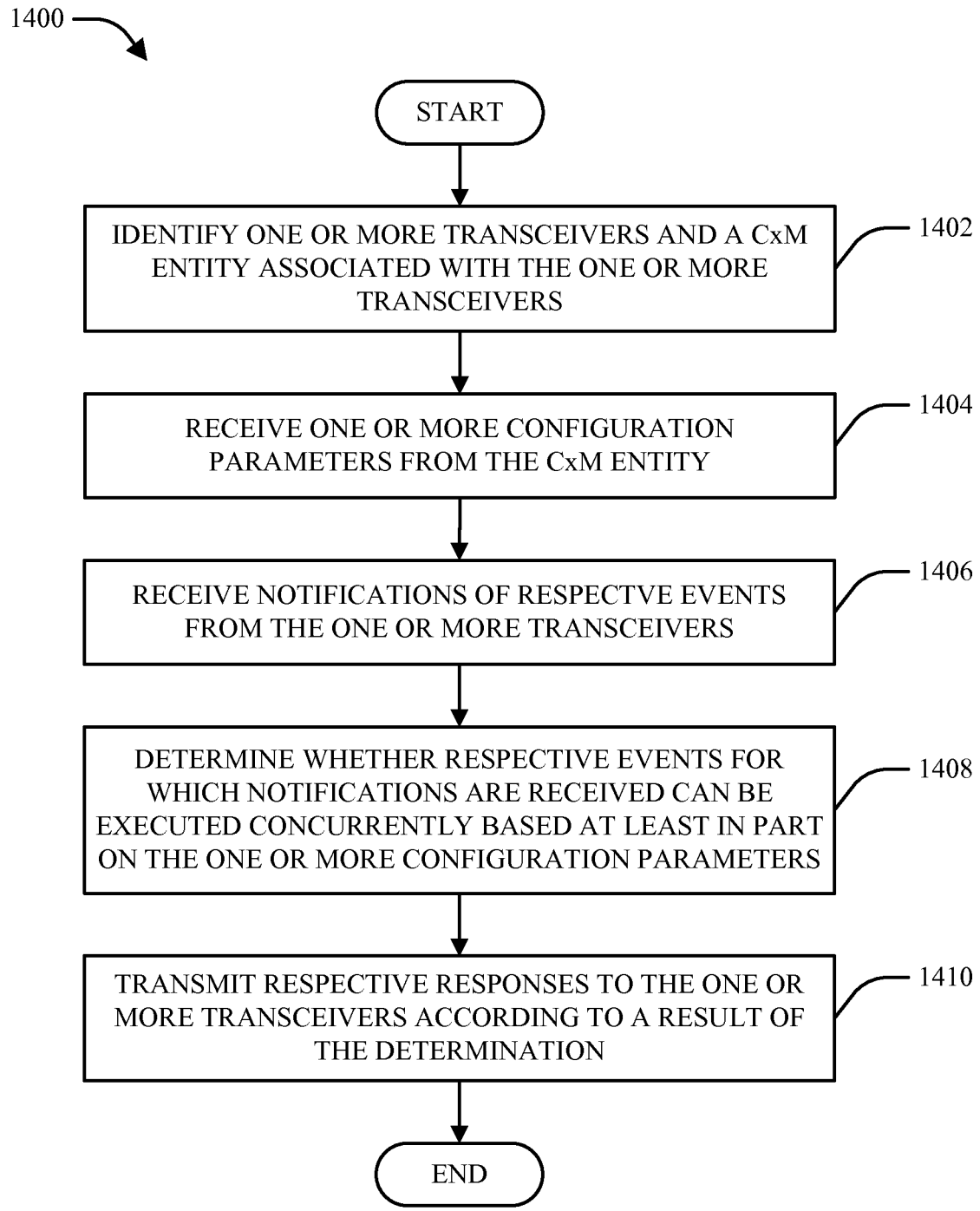
Figure 15:
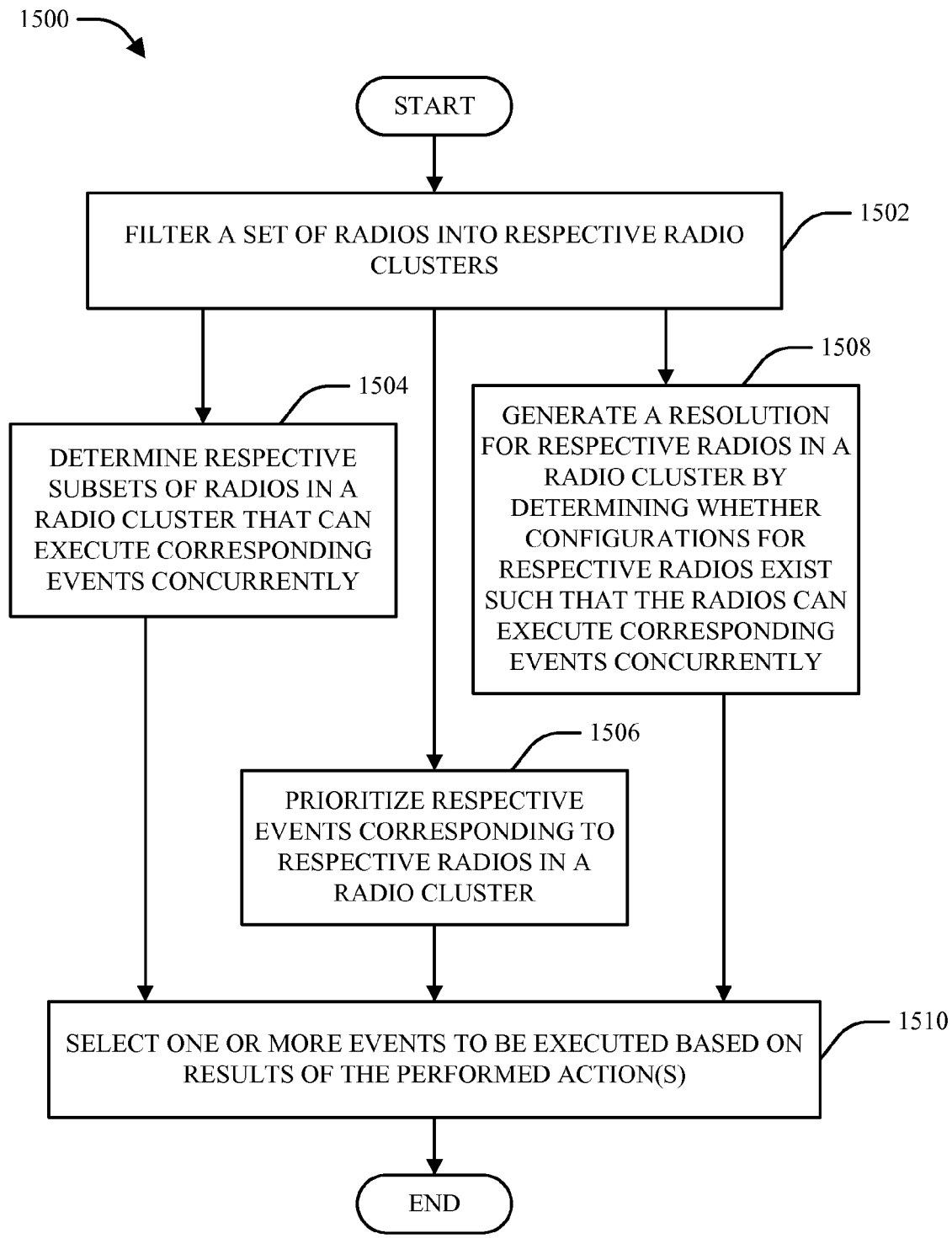

Referring now to FIGS. 13-15, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 13, illustrated is a methodology 1300 for managing coexistence between multiple transceivers (e.g., radios 220 and/or other suitable transceivers) associated with a communications device. It is to be appreciated that methodology 1300 can be performed by, for example, a wireless device (e.g., wireless device 110 or 200, via a control plane CxM entity 412 or a data plane CxM entity 414 associated with a CxM 240) and/or any other appropriate communications device. Methodology 1300 can begin at block 1302, wherein one or more transceivers and a CxM entity associated with the one or more transceivers are identified. Next, at block 1304, respective properties of the one or more transceivers are determined. Methodology 1300 can then conclude at block 1306, wherein one or more configuration parameters to be utilized by the CxM entity identified at block 1302 in connection with management of events associated with the transceiver(s) identified at block 1302 are generated based on notifications provided by the identified transceiver(s) (e.g., according to the properties determined at block 1304).

FIG. 14 illustrates a second methodology 1400 for managing coexistence between multiple transceivers associated with a communications device. Methodology 1400 can be performed by, for example, a wireless terminal and/or any other suitable network entity. Methodology 1400 begins at block 1402, wherein one or more transceivers and a CxM entity associated with the one or more transceivers are identified. Methodology 1400 can then proceed to block 1404, wherein one or more configuration parameters are received from the CxM entity identified at block 1402, and to block 1406, wherein notifications of respective events are received from the one or more transceivers identified at block 1402. Next, at block 1408, it is determined whether respective events for which notifications are received at block 1406 can be executed concurrently based at least in part on the configuration parameter(s) received at block 1404. Methodology 1400 can then conclude at block 1410, wherein respective responses are transmitted to the corresponding transceiver(s) according to a result of the determination performed at block 1408.

Turning next to FIG. 15, a third methodology 1500 for managing coexistence between multiple transceivers associated with a communications device is illustrated. Methodology 1500 can be performed by, for example, a multi-radio wireless device and/or any other suitable network entity. Methodology 1500 can begin at block 1502, wherein a set of radios are filtered into respective radio clusters. Upon completing the acts described at block 1502, methodology 1500 can proceed to one or more of blocks 1504, 1506, or 1508 for each cluster generated at block 1502. More particularly, at block 1504, respective subsets of radios in a given radio cluster are determined that can execute corresponding events concurrently. At block 1506, respective events corresponding to respective radios in a given radio cluster are prioritized. At block 1508, a resolution is generated for respective radios in a given radio cluster by determining whether configurations for respective radios exist such that the radios can execute corresponding events concurrently. Upon completing the acts described at block 1504, block 1506, and/or block 1508, methodology 1500 can conclude at block 1510, wherein one or more events to be executed are selected based on the results of the action(s) performed at blocks 1504, 1506, and/or 1508.

Figure 16:
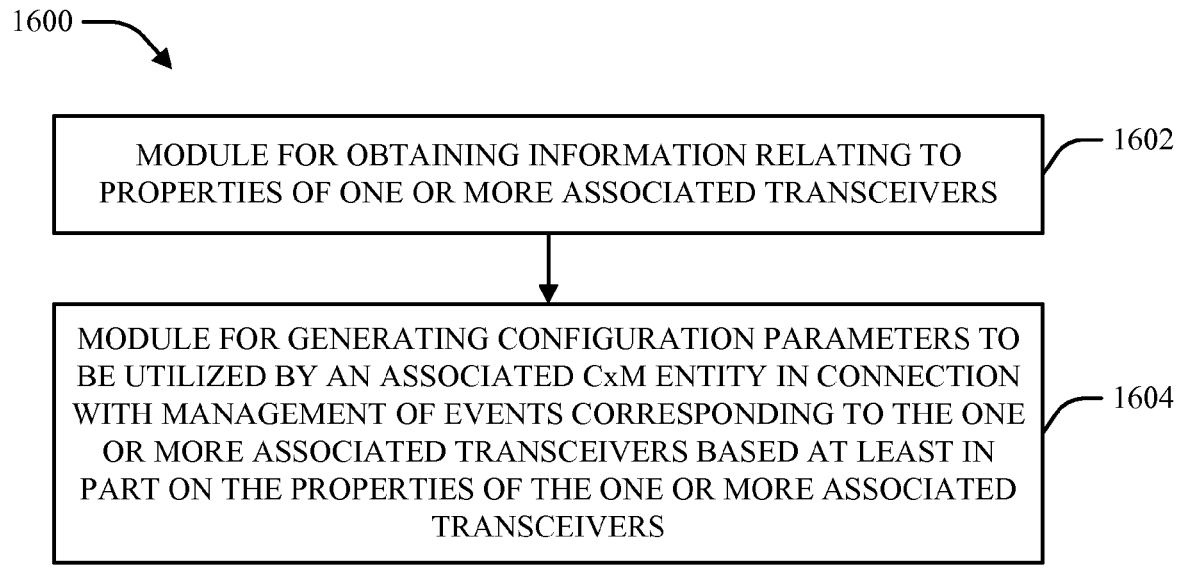
FIGS. 16-17 are block diagrams of respective apparatuses that facilitate implementation of a centralized architecture for multi-radio coexistence for a device operable in a communication system.
Figure 17:
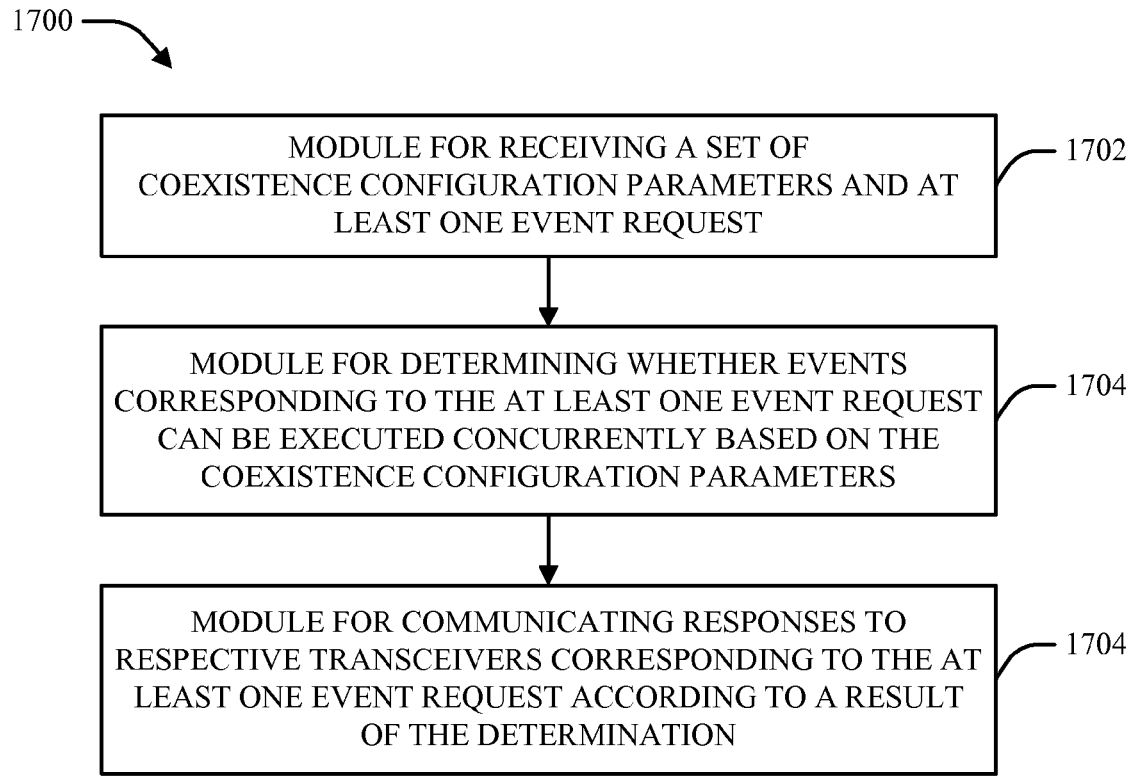

Referring now to FIGS. 16-17, respective apparatuses 1600-1700 that facilitate implementation of a centralized architecture for multi-radio coexistence for a device operable in a communication system are illustrated. It is to be appreciated that apparatuses 1600-1700 are represented as including functional blocks, which can be functional blocks that represent functions implemented by a processor, software, or combination thereof (e.g., firmware).

With reference first to FIG. 16, a first apparatus 1600 that facilitates a centralized architecture for multi-radio coexistence is illustrated. Apparatus 1600 can be implemented by a communications device (e.g., wireless device 110 or 200, via a CxM 240) and/or another suitable network entity and can include a module 1602 for obtaining information relating to properties of one or more associated transceivers and a module 1604 for generating configuration parameters to be utilized by an associated CxM entity in connection with management of events corresponding to the one or more associated transceivers based at least in part on the properties of the one or more associated transceivers.

Turning next to FIG. 17, a second apparatus 1700 that facilitates a centralized architecture for multi-radio coexistence is illustrated. Apparatus 1700 can be implemented by a multi-radio mobile device and/or another suitable network entity and can include a module 1702 for receiving a set of coexistence configuration parameters and at least one event request, a module 1704 for determining whether events corresponding to the at least one event request can be executed concurrently based on the coexistence configuration parameters, and a module 1706 for communicating responses to respective transceivers corresponding to the at least one event request according to a result of the determination.

Figure 18:
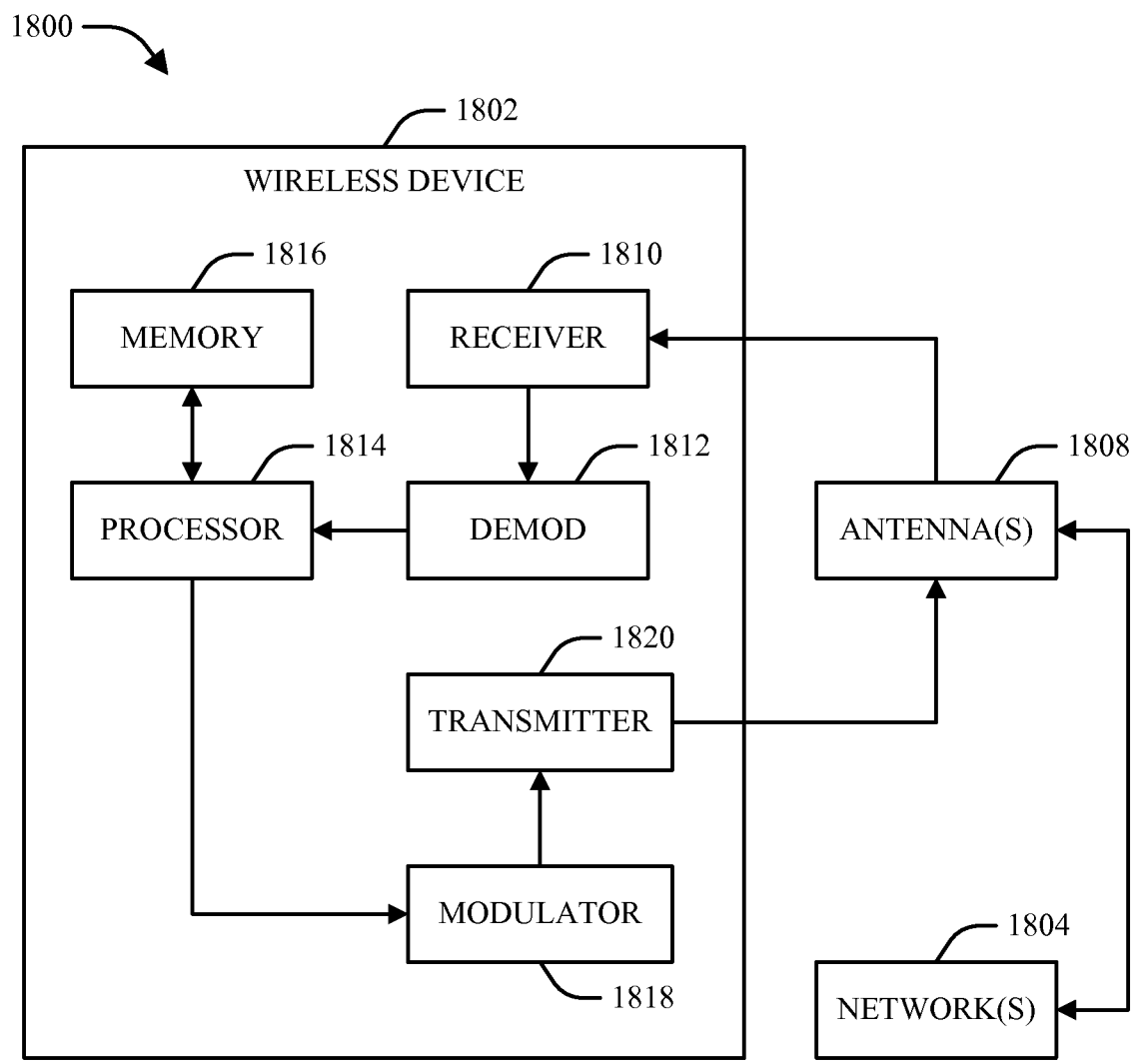
FIG. 18 is a block diagram of a wireless communications device that can be utilized to implement various aspects described herein.

FIG. 18 is a block diagram of a system 1800 that can be utilized to implement various aspects of the functionality described herein. In one example, system 1800 includes a wireless device 1802. As illustrated, wireless device 1802 can receive signal(s) from one or more networks 1804 and transmit to the one or more networks 1804 via one or more antennas 1808. Additionally, wireless device 1802 can comprise a receiver 1810 that receives information from antenna(s) 1808. In one example, receiver 1810 can be operatively associated with a demodulator (Demod) 1812 that demodulates received information. Demodulated symbols can then be analyzed by a processor 1814. Processor 1814 can be coupled to memory 1816, which can store data and/or program codes related to terminal 1802. Additionally, wireless device 1802 can employ processor 1814 to perform methodologies 1300-1500 and/or other similar and appropriate methodologies. Wireless device 1802 can also include a modulator 1818 that can multiplex a signal for transmission by a transmitter 1820 through antenna(s) 1808.

With respect to the above description, one of ordinary skill in the art can appreciate that various aspects described above can be implemented by hardware, software, firmware, middleware, microcode, or any combination thereof. When the systems and/or methods are implemented in software, firmware, middleware or microcode, program code or code segments, they can be stored in a machine-readable medium, such as a memory or storage device. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

Moreover, those of skill in the art can appreciate that information and signals can be represented using any of a variety of different technologies and techniques. For example, data, instructions, commands, information, signals, bits, symbols, and/or chips that may be referenced throughout the above description can be represented by voltages, currents, electromagnetic waves, magnetic fields or particles, optical fields or particles, or any combination thereof.

In addition, it is to be understood that the steps of the various methods and/or algorithms as described in connection with the disclosure above can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An example storage medium can be coupled to a processor such that the processor can read information from, and write information to, the storage medium. In the alternative, the storage medium can be integral to the processor. The processor and the storage medium can reside in an ASIC, which in turn can reside in a user terminal and/or in any other suitable location. Alternatively, processor and the storage medium can reside as discrete components in a user terminal.

The above description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is instead to be accorded the widest scope consistent with the principles and novel features disclosed herein. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    identifying, by a first coexistence manager (CxM) entity, one or more transceivers and a second coexistence manager (CxM) entity associated with the one or more transceivers;
    determining, by the first CxM entity, properties of the one or more transceivers;
    generating, by the first CxM entity, one or more configuration parameters to be used by the second CxM entity; and
    providing the one or more configuration parameters from the first CxM entity to the second CxM entity to enable the first CxM entity and the second CxM entity to interact to cooperatively manage events associated with the one or more transceivers based on notifications provided by the one or more transceivers, in which management of a functionality relating to coexistence in association with the one or more transceivers is divided between the first CxM entity managing a first portion of the functionality and the second CxM entity managing a second portion of the functionality, and in which the first portion is distinct from the second portion.

2. The method of claim 1, wherein:
    the determining comprises identifying at least one of the one or more transceivers entering an enabled state from a disabled state; and
    the method further comprises registering the at least one transceiver entering an enabled state.

3. The method of claim 1, wherein the generating comprises:
    identifying a set of potential pairwise collisions between at least two of the one or more transceivers; and
    providing the set of potential pairwise collisions to the second CxM entity.

4. The method of claim 1, wherein:
    the determining comprises determining operating states of the one or more transceivers; and
    the method further comprises configuring an associated sleep mode based at least in at on the operating state of the at least one of the one or more transceivers.

5. The method of claim 1, wherein the generating comprises generating an interference table relating to interference at respective victim transceivers caused by one or more transmit power levels at respective aggressor transceivers.

6. The method of claim 1, wherein the generating comprises generating parameters relating to priorities of events executable by the one or more transceivers.

7. The method of claim 1, wherein the generating comprises selecting at least one protocol for communication between the second CxM entity and the one or more transceivers.

8. The method of claim 1, wherein the generating comprises:
    receiving event conflict information corresponding to the one or more transceivers from the second CxM entity; and
    generating the one or more configuration parameters-based at least in part on the event conflict information.

9. The method of claim 8, wherein the generating further comprises:
    identifying a conflict between a set of events associated with the one or more transceivers based on the event conflict information; and
    instructing modification of a frequency channel and/or a radio technology used for at least one event associated with the conflict.

10. The method of claim 9, wherein the instructing modification comprises instructing modification of a radio technology used for at least one event associated with the conflict in cooperation with one or more upper layer entities.

11. The method of claim 1, wherein the generating comprises:
    receiving configuration information from one or more upper layer entities; and
    generating the one or more configuration parameters based at least in part on the configuration information.

12. The method of claim 1, wherein the second CxM entity is a data plane CxM entity.

13. The method of claim 1, wherein the first CxM entity is a control plane CxM entity.

14. The method of claim 1, wherein the one or more transceivers comprise at least one radio.

15. The method of claim 1, in which the first CxM entity operates at a slower timescale than the second CxM entity.

16. A wireless communications apparatus, comprising:
    a memory for a first coexistence manager (CxM) entity, the memory configured to store data relating to one or more radios and a second CxM entity associated with the one or more radios; and
    a processor configured to cause:
    determining, by the first CxM entity, properties of the one or more radios,
    generating, by the first CxM entity, one or more configuration parameters based at least in part on the respective properties of the one or more radios, and
    providing the one or more configuration parameters from the first CxM entity to the second CxM entity to enable the first CxM entity and the second CxM entity to interact to cooperatively manage events associated with the one or more radios based on notifications provided by the one or more radios, in which management of a functionality relating to coexistence in association with the one or more radios is divided between the first CxM entity managing a first portion of the functionality and the second CxM entity managing a second portion of the functionality, and in which the first portion is distinct from the second portion.

17. The wireless communications apparatus of claim 16, wherein the processor is further configured to identify at least one of the one or more radios entering an enabled state from a disabled state and to register the at least one radio entering an enabled state.

18. The wireless communications apparatus of claim 16, wherein the processor is further configured:
    to identify a set of potential pairwise collisions between at least two of the one or more radios, and
    to provide the set of potential pairwise collisions to the second CxM entity.

19. The wireless communications apparatus of claim 16, wherein the processor is further configured:

to determine operating states of the one or more radios, and
to configure a sleep mode of the wireless communications apparatus and/or the second CxM entity based at least in part on the operating states of the One or more radios.

20. The wireless communications apparatus of claim 16, wherein the processor is further configured to generate parameters relating to priorities of events executable by the one or more radios.

21. The wireless communications apparatus of claim 16, wherein the processor is further configured:
to receive event conflict information corresponding to the one or more radios from the second CxM entity, and
to generate the one or more configuration parameters based at least in part on the event conflict information.

22. The wireless communications apparatus of claim 16, wherein the processor is further configured:
to identify a conflict between a set of events associated with the one or more radios that occurs above a threshold frequency based on the event conflict information and,
to instruct modification of a frequency channel and/or a radio technology used for at least one event associated with the conflict.

23. The wireless communications apparatus of claim 22, wherein:
the memory further stores data relating to one or more upper layer entities; and
the processor is further configured to instruct modification of a radio technology used for the at least one event associated with the conflict in cooperation with the one or more upper layer entities.

24. The wireless communications apparatus of claim 16, wherein:
the memory further stores data relating to one or more upper layer entities; and
the processor is further configured:
to receive configuration information from the one or more upper layer entities, and
to generate the one or more configuration parameters based at least in part on the configuration information.

25. The wireless communications apparatus of claim 16, wherein the second CxM entity is a data plane CxM entity.

26. The wireless communications apparatus of claim 16, wherein the first CxM entity is a control plane CxM entity.

27. An apparatus, comprising:
means for obtaining information relating to properties of one or more transceivers;
means for generating configuration parameters to be used by a first coexistence manager (CxM) entity associated with the one or more transceivers; and
means for providing the one or more configuration parameters to the first CxM entity to enable the first CxM entity and another CxM entity to interact to cooperatively manage events associated with the one or more transceivers with a second CxM entity based on notifications provided by the one or more transceivers, in which management of a functionality relating to coexistence in association with the one or more transceivers is divided bwtween the first CxM entity managing a first portion of the functionality and the second CxM entity managing a second portion of the functionality, and in which the first portion is distinct from the second portion.

28. The apparatus of claim 27, wherein:
the means for obtaining information comprises means for identifying at least one transceiver of the one or more transceivers entering an enabled state from a disabled state; and
the apparatus further comprises means for registering the at least one transceiver entering an enabled state.

29. The apparatus of claim 27, wherein the means for generating comprises means for generating configuration parameters relating to potential pairwise collisions between at least two of the one or more transceivers.

30. The apparatus of claim 27, wherein:
the means for obtaining information comprises means for determining operating states of the one or more associated transceivers; and
the apparatus further comprises means for configuring an associated sleep mode based at least in part on the operating states of the one or more associated transceivers.

31. The apparatus of claim 27, wherein the means for generating comprises means for generating the configuration parameters relating to priorities of events executable by the one or more associated transceivers.

32. The apparatus of claim 27, wherein the means for generating comprises:
means for receiving event conflict information corresponding to the one or more associated transceivers from the CxM entity; and
means for generating the configuration parameters based at least in part on the event conflict information.

33. The apparatus of claim 27, further comprising means for cooperating with one or more upper layer entities with respect to modification of a radio technology used for at least one event associated with one or more associated transceivers based at least in part on the properties of the one or more associated transceivers.

34. The apparatus of claim 27, wherein the means for generating comprises:
means for receiving configuration information from one or more upper layer entities; and
means for generating the configuration parameters based at least in part on the configuration information.

35. The apparatus of claim 27, wherein one or more associated transceivers comprises at least one radio.

36. A computer program product, comprising:
a non-transitory computer-readable medium having non-transitory program code recorded thereon, the program code comprising:
code it causing a computer to obtain, by a first coexistence manager (CxM) entity, information relating to properties of one or more-radios;
code for causing a computer to generate configuration parameters to be used by a second coexistence manager (CxM) entity associated with the one or more radios; and
code for providing the configuration parameters from the first CxM entity to the second CxM entity to enable the first CxM entity and the second CxM entity to interact to cooperatively manage events associated with the one or more radios based on notifications provided by the one or more radios, in which management of a functionality relating to coexistence in association with the one or more radios is divided between the first CxM entity managing a first portion of the functionality and the second CxM entity managing a second portion of the functionality, and in which the first portion is distinct from the second portion.

* * * * *